(12) United States Patent
Liess et al.

(10) Patent No.: US 7,589,709 B2
(45) Date of Patent: *Sep. 15, 2009

(54) METHOD OF MEASURING THE MOVEMENT OF AN INPUT DEVICE

(75) Inventors: Martin Dieter Liess, Eindhoven (NL); Carsten Heinks, Eindhoven (NL); Aldegonda Lucia Weijers, Eindhoven (NL); Marianne Francine Somers Van Os, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 836 days.

This patent is subject to a terminal disclaimer.

(21) Appl. No.: 10/516,144

(22) PCT Filed: Jun. 4, 2003

(86) PCT No.: PCT/IB03/02056

§ 371 (c)(1),
(2), (4) Date: Nov. 30, 2004

(87) PCT Pub. No.: WO03/102717

PCT Pub. Date: Dec. 11, 2003

(65) Prior Publication Data

US 2005/0243053 A1    Nov. 3, 2005

(30) Foreign Application Priority Data

Jun. 4, 2002    (EP)    .................................... 02077217

(51) Int. Cl.
*G09G 5/08*    (2006.01)
(52) U.S. Cl. ....................... 345/157; 715/856
(58) Field of Classification Search ................. 345/156, 345/157; 715/856; 178/18.01, 18.06, 18.09
See application file for complete search history.

(56) References Cited

U.S. PATENT DOCUMENTS 3,644,042 A * 2/1972 Kolb et al. .................... 356/4.1

(Continued)

FOREIGN PATENT DOCUMENTS

EP    0942285 A1    9/1999

(Continued)

OTHER PUBLICATIONS

M. Liess et. al. A miniturized multidirectional optical motion sensor and input device based on laser self-mixing; Dec. 2002; pp. 2001-2006; vol. 13 No. 12.

(Continued)

*Primary Examiner*—Richard Hjerpe
*Assistant Examiner*—Tom V Sheng

(57) ABSTRACT

A small and cheap user's input device for measuring scroll- and-click movements of a finger (132) or other object relative to the device comprises at least one sensor unit (124, 126, 130) and sensor signal analyzing means (136) to derive click information and scroll information from the same sensor signal. The analyzing means is designed such as to recognize a first typical time pattern of a click action and a second typical time pattern of a scroll action. Moreover in analyzing a sensor signal obtained during a time interval data obtained during other time intervals can be used to supply reliable signals. This device can be used in a number of different consumer apparatus, such as a mobile phone (134).

20 Claims, 18 Drawing Sheets

U.S. PATENT DOCUMENTS

| | | | | |
|---|---|---|---|---|
| 5,689,284 A | * | 11/1997 | Herget | 345/661 |
| 6,452,683 B1 | * | 9/2002 | Kinrot et al. | 356/499 |
| 6,707,027 B2 | * | 3/2004 | Liess et al. | 250/221 |
| 6,734,883 B1 | * | 5/2004 | Wynn et al. | 715/830 |
| 6,992,658 B2 | * | 1/2006 | Wu et al. | 345/169 |
| 7,339,683 B2 | * | 3/2008 | Weijers et al. | 356/519 |
| 7,439,484 B2 | * | 10/2008 | Liess et al. | 250/221 |

FOREIGN PATENT DOCUMENTS

| | | |
|---|---|---|
| EP | 1113385 A2 | 7/2001 |
| EP | 0942285 B1 | 12/2002 |
| EP | 1113385 A3 | 3/2004 |
| WO | WO0133540 A1 | 5/2001 |

OTHER PUBLICATIONS

H. W. Jentink et. al. Small laser doppler velocimeter based on the self-mixing effect in a diode laser; Jan. 15, 1988; pp. 379-385; vol. 27, No. 2.

M.H. Koelink et. al. Laser doppler velocimeter based on the self-mixing effect in a fiber-coupled semiconductor laser: theory; Jun. 20, 1992; pp. 3401-3408; vol. 31, No. 18.

* cited by examiner

METHOD OF MEASURING THE MOVEMENT OF AN INPUT DEVICE

The invention relates to a method of measuring movement of an object relative to a user's input device, which movement comprises at least a scroll action and a click action, whereby use is made of a user's input device comprising at least one sensor unit supplying a sensor signal and analyzing means for analyzing the sensor signal, whereby each sensor unit is used to measure a scroll action and a click action.

The invention also relates to an input device for carrying out the method and to an apparatus comprising such an input device.

Such a method and user's input device (hereinafter input device) are known from European patent application EP-A 1 113 385. The sentence: a sensor unit is used to measure scroll action and click action, is understood to mean that a sensor unit supplies information, which may be first information about a scroll action or second information about a click action. In practice, the first information and the second information are not present simultaneously. The input device of EP-A 1 113 385 is an optical device and functions as an optical mouse. It is intended to be used, for example, in a computer configuration to move a cursor across the computer display or monitor, for example to select an item, or function, of a displayed menu. Conventionally, such an optical mouse is moved across a mouse pad by hand, like the more conventional mechanical mouse. Preferably, the input device is an "inverted" optical mouse. The input device is then stationary and, for example, built-in in the keyboard of a desktop- or notebook- or palmtop computer. To select an item from a menu, a human finger (the object) is moved in one direction across a transparent window in the housing of the input device. This movement is called a scroll action. The input device may be small, because the optical module for measuring the finger movement can be made very small. In fact, the input device may be reduced to the optical measuring module. This opens the way to new applications for the input device. For example, a user's input function can be built in a mobile phone for selecting items on a menu and for accessing Internet pages, in other hand-held apparatus or in a notebook computer.

In EP-A 1 113 385 is noted that, in addition to a scroll action, a user should also be able to make an input action to indicate selection of an option of the menu. This can be done by means of a selection button or key, which forms part of a conventional keyboard. Another possibility of selection input is a short input such as a finger tap to the input device. Such a finger tap can be detected by the sensor, which measures a scroll action. The circuitry for processing the sensor signal should then be adapted, but EP-A 1 113 385 does not disclose how this detection is carried out.

In the input device of EP-A 1 113 385 an imaging lens is used to image the surface relief of a finger on a sensor comprising a larger number of sensor elements, which sensor is called a fingerprint sensor. Finger movement is measured by comparing a number of successive finger images sensed by the fingerprint sensor.

In the labs of the inventors recently a new scroll-and-click input measuring method and device have been developed, which are substantially simpler, cheaper and more reliable than a method and device based on a fingerprint sensor. The new method and input device use a concept that is new for the type of input devices discussed here. As will be explained later on, this concept is a combination of Doppler shift introduced by a moving finger in a measuring beam and the so-called self-mixing effect in a diode laser. This is the phenomenon that radiation emitted by a diode laser and, after reflection, re-entering the cavity of the diode laser induces a variation in the gain of the laser and thus in the radiation emitted by the laser. The new scroll-and-click method and device allow measuring both the velocity and direction of the scroll action and detecting a click action by means of two diode lasers measuring paths (sensor units), which are, for example, orientated at opposite sharp angles relative to window of the device. This method will be referred to as the vector decomposition method. The diode lasers may be supplied with periodically varying electrical currents and measuring signals generated during first and second half-periods may be compared to determine the direction of the scroll action.

It is an object of the invention to provide means for substantially improving this method and device such that an unambiguous discrimination between a scroll action and a click action and a very reliable measurement of a scroll action direction becomes possible and moreover allows to reduce the number of sensor units in a scroll-and-click device.

The method is characterized in that scroll action information and click action information are derived from the same at least one sensor signal and that analyzing the sensor signal comprises determining whether such a signal shows a first typical time pattern of a click action or a second typical time pattern of a scroll action, which first time pattern is different from the second time pattern.

The invention uses the fact that a user will never scroll and click at the same time and the insight that a click action generates a sensor unit signal that is substantially different from the sensor unit signal generated by a scroll action. The click action is a fast, short-duration, movement, which is preceded and succeeded by a period of non-movement and thus generates a pulse like response, or sensor output signal. A click action can be detected independently of the individual user's finger motorization and the direction of the click (up-click or down-click). A scroll action generates, during the same time period, a considerably larger number of signal undulations in the sensor output signal than the single undulation, i.e. the pulse, a click action generates.

A preferred embodiment of the method is characterized in that for the analysis of the at least one sensor signal during a time interval use is made of movement data obtained during other time intervals.

Taking past measurements and future measurements into account when analyzing signals measured during a given time interval allows very reliably determining the direction of a scroll action, i.e. an upward scroll or a downward scroll. Delaying in time the analysis of signals obtained during said given time interval allows using said future measurements, i.e. measurements done after the said given time interval.

The method may be further characterized in that the at least one sensor is activated by activation pulses and that the sensor signal analysis is performed during measuring time intervals which are determined by the activation pulses.

In case of an optical input device using diode lasers the activation pulses are the electric current pulses for controlling the diode lasers. The sensor signals are sampled at each of the diode laser controlling pulses.

An embodiment of the method is characterized in that a first number and a second number of sensor signal undulations during a first half and a second half, respectively, of a measuring time interval are determined and in that the sum of the first and second number is used to detect click action motion during that measuring time interval.

Thereby use is made of the specific effect a click action has on the sensor signal and on the number of undulations within the signal half periods, which effect is different from that of a scroll action. The signal periods correspond to the periods of the diode laser drive current. By comparing the sum value, preferably after combining this value with past and future values, with a click threshold value, the presence of a click action movement during said measuring time interval can be established.

An embodiment of the method which allows reliably determining the direction of a scroll action, is characterized in that a first number and a second number of sensor(s) signal undulations during a first half and a second half, respectively, of a measuring time interval are determined, in that the difference of the first and second number is used to determine the direction of a scroll movement and that the speed of that movement is determined from the sum if the first and second number.

A scroll action comprises two parameters: speed, which can only be positive, and direction, which can be positive or negative. Speed and direction together constitute velocity, which is a vector. With respect to the direction (up or down) of the scroll action, use is made of the facts that a user will not change the scroll direction more than once during a predetermined time period and that a change in scroll direction is attended by a temporally low speed, i.e. mathematically the speed will be zero for an infinitely short moment. The signal processing circuitry, for example a microprocessor, calculates with a high frequency, for example every ten milliseconds the value of the speed Especially the scroll movement direction detection can be substantially improved by combining the measuring results of past and future time intervals with those of the said time interval. Thereby it is checked whether both amongst the recent past time intervals and amongst the nearby future time intervals there is a time interval wherein the speed has a minimum value. If this is the case, the direction of movement has not changed and the direction of movement during the actually analyzed time interval can be considered as the average direction between the two time intervals wherein the speed is minimal. The scroll movement speed at the actually analyzed time interval is given by the sum of the first and second numbers of signal undulations in this time interval.

This method of determining the scroll direction (up or down) is more reliable than the above-mentioned vector decomposition method, which only compares the number of undulations during succeeding half periods of a periodic sensor signal generated by supplying a periodical varying electrical current to the diode laser of the sensor. Moreover the new method minimizes the chance that a sudden begin or end of a scroll action is misinterpreted as a click action. The latter may happen in the method and device of EP-A 1 113 385, which mentions only a sudden input such as a finger tap.

The analyzing steps mentioned above are performed both for an input device having only one sensor unit and for an input device having two or more sensor units. In the latter case, which will be the most usual case, the above-mentioned sums and subtraction encompass the number of signal undulations of the signals supplied by the second and further sensor unit.

To perform the above-mentioned analyzing steps algorithm of different forms may be used, which reflects in different embodiments of the method.

A first embodiment is characterized in that for sensor signal analysis use is made of an algorithm comprising steps to firstly determine whether a click action is performed and secondly determine whether a scroll action is performed as well as the direction and the speed of the scroll movement.

A second embodiment is characterized in that for sensor signal analysis use is made of an algorithm comprising steps to firstly determine whether a scroll action is performed as well the direction and the speed of the scroll movement and secondly determine whether a click action is performed.

The new sensor signal interpretation method may be combined with other methods, such as the vector decomposition method, to obtain further advantages.

The invention may be used with different types of user's input devices.

A first embodiment of the method is characterized in that use is made of a capacitive input device comprising at least one capacitive sensor for measuring at least the scroll action and the click action.

Capacitive sensors are cheap and small and thus very suitable for use in a hand-held small and lightweight apparatus. A capacitive sensor can detect not only conducting materials, but also a material having a dielectric constant, which is different from that of its surroundings, such as a finger in air. Such a sensor allows measuring of the position of a finger in two dimensions.

A preferred embodiment of the method is characterized in that use is made of an optical input device comprising at least one optical sensor for measuring at least the scroll action and the click action.

An optical input device is more flexible and less dependent on environment circumstances. Such a device may also have a simple structure and be cheap and small. Different types of optical input may be used with the method.

Preferably, an embodiment of the method, wherein the measurement performed by each optical sensor unit comprises the steps of illuminating an object surface with a measuring laser beam and converting a selected portion of the measuring beam radiation reflected by the surface into an electric signal, is used. This embodiment is characterized in that measuring beam radiation reflected back along the measuring beam and re-entering the laser cavity, which emits the measuring beam, is selected and in that changes in operation of the laser cavity are measured, which are due to interference of the re-entering radiation and the optical wave in the laser cavity and are representative of a relative object movement,.

This embodiment of the method uses the so-called self-mixing effect in a diode laser. This is the phenomenon that radiation emitted by a diode laser and re-entering the cavity of the diode laser induces a variation in the gain of the laser and thus in the radiation emitted by the laser. The object and the input device are moved relative to each other such that the direction of movement has a component in the direction of the laser beam. Upon movement of the object and the input device, the radiation scattered by the object has a frequency different from the frequency of the radiation illuminating the object, because of the Doppler effect. Part of the scattered light is focused on the diode laser by the same lens that focuses the illumination beam on the object. Because some of the scattered radiation enters the laser cavity through the laser mirror, interference of light takes place in the laser. This gives rise to fundamental changes in the properties of the laser and the emitted radiation. Parameters, which change due to the self-mixing effect, are the power, the frequency and the line width of the laser radiation and the laser threshold gain. The result of the interference in the laser cavity is a fluctuation of the values of these parameters with a frequency that is equal to the difference of the two radiation frequencies. This difference is proportional to the velocity of the object. Thus the velocity of the object and, by integrating over time, the displacement of the object can be determined by measuring the value of one of said parameters. This method can be carried out with only a few and simple components and does not require accurate alignment of these components.

The use of the self-mixing effect for measuring velocities of objects, or in general solids and fluids, is known per se. By way of example, reference is made to the article: "Small laser Doppler velocimeter based on the self-mixing effect in a diode laser" in Applied Optics, Vol. 27, No. 2, 15 Jan. 1988, pages 379-385, and the article: "Laser Doppler velocimeter based on the self-mixing effect in a fiber-coupled semiconductor laser: theory" in Applied Optics, Vol. 31, No.8, 20 Jun. 1992, pages 3401-3408. However, up to now, use of the self-mixing effect in an input device as defined above has not been suggested. This new application is based on the recognition that a measuring module using the self-mixing effect can be made so small and cheap that it can be installed easily and without much additional cost in existing devices and apparatus.

The preferred embodiment of the method may be further characterized in that the impedance of the diode laser cavity is measured.

The impedance of the laser diode is one of the parameters, which change due to the interference effect and is a function of the relative movement of the input device and the object. This impedance can be determined by measuring the voltage across the diode laser and dividing the measured voltage value by the known value of the electric current sent through the diode laser.

Preferably, the preferred embodiment of the method is characterized in that the intensity of the laser radiation is measured.

Measuring the intensity of the laser radiation is the simplest way of determining the changes in the laser cavity, because this can be done with a simple photo diode.

The invention also relates to an input device for carrying out the method and and comprising at least one sensor unit and signal analyzing means, each sensor unit measuring scroll action and click action and supplying a sensor signal to the analyzing means. This input device is characterized in that the signal analyzing means comprises means for distinguishing a first typical sensor signal time pattern of a click action from a second typical sensor signal time pattern of scroll action.

The input device may be further characterized in that the signal analyzing means comprises storage and/or delaying means for combining measuring results obtained at different time intervals.

The input device may be further characterized in that the at least one sensor unit is activated by an activation signal and in that the analyzing means is synchronized in time with the sensor unit such as to perform analysis in measuring time intervals, which are determined by the activation signal.

An embodiment of the input device is characterized in that the analyzing means comprises counting means for counting a first number and a second number of sensor signal undulations during a first and second half, respectively, of a measuring time interval and summing means for adding the first number and the second number and to supply a signal that comprises click action information.

A further embodiment of the input device is characterized in that the analyzing means comprises means for counting a first number and a second number of sensor signal undulations during a first and second half, respectively, of a measuring time interval and subtracting means determining the difference between the first and second number and to supply a signal that comprises information about the direction of a scroll movement and a signal that comprises movement speed information.

A practical embodiment of the input device is characterized in that the analyzing means is provided with an algorithm, which comprises steps to firstly determine whether a click action is performed and secondly determine whether a scroll action is performed as well as the direction and the speed of the scroll action.

An alternative embodiment of the input device is characterized in that the analyzing means is provided with an algorithm, which comprises steps to firstly determine whether a scroll action is performed as well as the direction and the speed of the scroll movement and secondly determine whether a click action is performed.

The signal analyzing means including the two algorithms may be integrated in the signal processing and controlling means, for example a micro processor of the apparatus wherein the input device is used.

A first main embodiment of the input device is characterized in that it is a capacitive device, which comprises at least one capacitive sensor unit.

The invention allows measurement of both a scroll action and a click action by means of only one sensor unit, because the invention uses the different natures of the scroll movement and the click movement.

In case more movements have to be measured or more options are required another type of the first main embodiment can be used. This type of input device is characterized in that it comprises at least two capacitive sensor units.

Under circumstances a capacitive sensor may suffer from drift if the temperature and humidity of the surroundings change. Using two capacitive sensors allows a drift-free measurement of the relative fast scroll and click movements.

A second, preferred, main embodiment of the input device is characterized in that it is an optical device, which comprises at least one optical sensor unit, including a diode laser, having a laser cavity, for generating a measuring beam, optical means for converging the measuring beam in a plane near the object and converting means for converting measuring beam radiation reflected by the object into an electrical sensor signal.

Like the capacitive input device, the optical input device functions well with one optical sensor unit, but another type of optical input device may be preferred under circumstances. This type of input device is characterized in that it comprises at least two optical sensor units.

The optical input device may be further characterized in that it comprises a partially transmitting component, arranged close to a transparent window of the device, to split-off a portion of the measuring beam as a reference beam and a radiation-sensitive detection means having a small opening to receive the reference beam and measuring beam radiation reflected by the object.

The construction as such of this optical device is disclosed in EP-A 0 942285, which relates to an optical input device using homodyne or heterodyne detection All disclosed embodiments comprise a diffraction grating, which is arranged close to a transparent window of the device. The grating reflects a portion of the measuring beam, preferably radiation diffracted in one of the first orders, to a detector which also receives a portion of the radiation reflected and scattered by the object (finger) surface. The laser radiation diffracted in the first order by the grating is called a local oscillator beam, and the detector coherently detects the radiation from the object surface using this local oscillator beam. Interference of the local oscillator beam and radiation reflected by the object and incident on the detector gives rise to a beat signal from the detector, which signal is determined by the relative movement, in its own plane, of the object surface. The input device of EP-A 0 942 285 comprises, besides the grating, a collimator lens, a focussing lens and a pinhole diaphragm, arranged before the detector, which elements should be aligned carefully.

Preferably, the optical input device is characterized in that the converting means are constituted by the combination of the laser cavity and measuring means for measuring changes in operation of the laser cavity, which are due to interference of reflected measuring beam radiation re-entering the laser cavity and the optical wave in this cavity and are representative of the relative movement of the object and the input device.

This optical input device comprises less components and can be manufactured easier and at lower costs than the input device of EPO-A 0 942 285.

A first embodiment of the optical input device is characterized in that the measuring means are means for measuring a variation of the impedance of the laser cavity.

A preferred embodiment of the optical input device is characterized in that the measuring means is a radiation detector for measuring radiation emitted by the laser.

The radiation detector may be arranged in such a way that it receives part of the radiation of the measuring beam.

This embodiment of the input device is, however, preferably characterized in that the radiation detector is arranged at the side of the laser cavity opposite the side where the measuring beam is emitted.

Usually, diode lasers are provided with a monitor diode at their rear side. Usually, such a monitor diode is used to stabilize the intensity of the laser beam emitted at the front side of the diode laser. Now the monitor diode is used to detect changes in the laser cavity, which are generated by radiation of the measuring beam re-entering the laser cavity.

The input device may be used in different applications, such as in mobile phone, a cordless phone, a laptop computer, a mouse for a desktop computer and a remote control unit, as claimed in claims 29-33.

These and other aspects of the invention are apparent from and will be elucidated, by way of non-limitative example, with reference to the embodiments described hereinafter. In the drawings:

FIG. 1*a* shows, in cross-section, an embodiment of an optical input device, which uses the self-mixing effect and wherein the invention can be implemented;

FIG. 1*b* is a top view of this device;

Figure 1A:
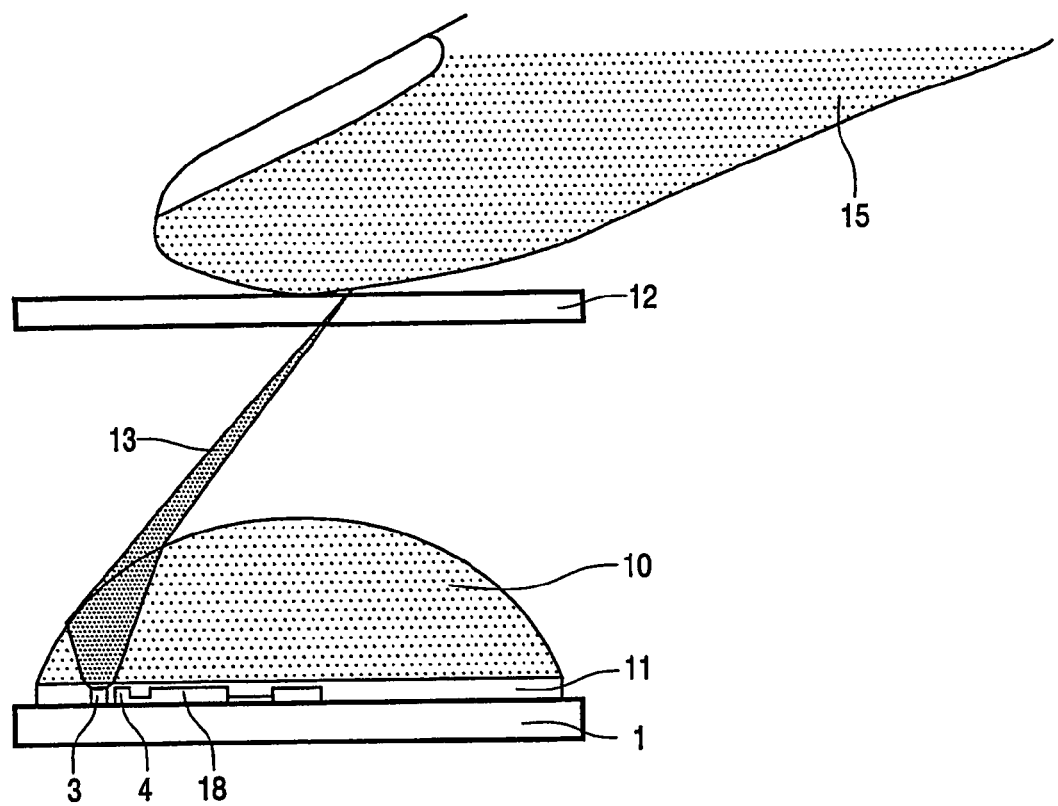
Figure 1B:
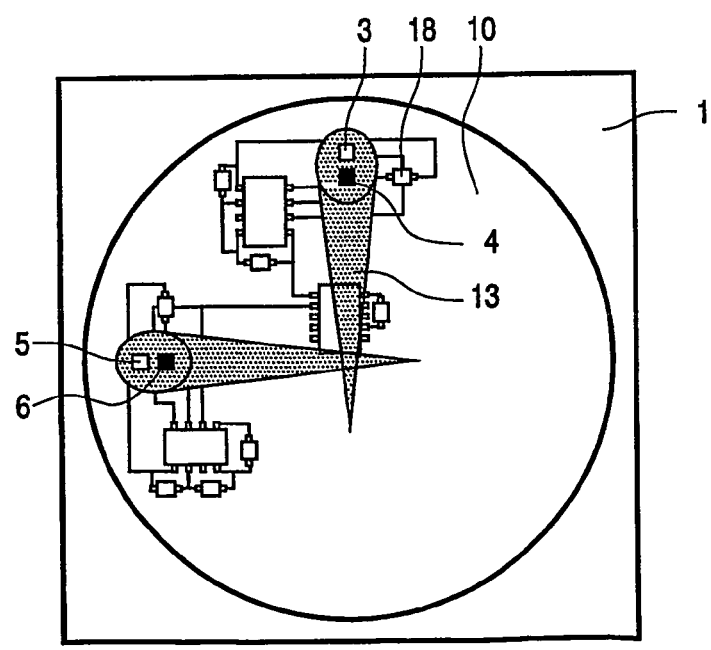
Figure 21A:
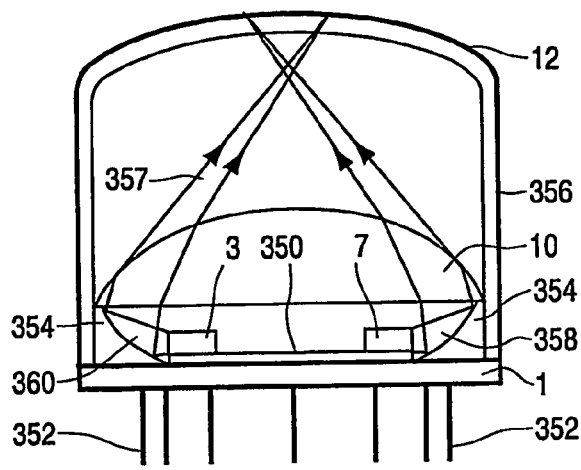
Figure 21B:
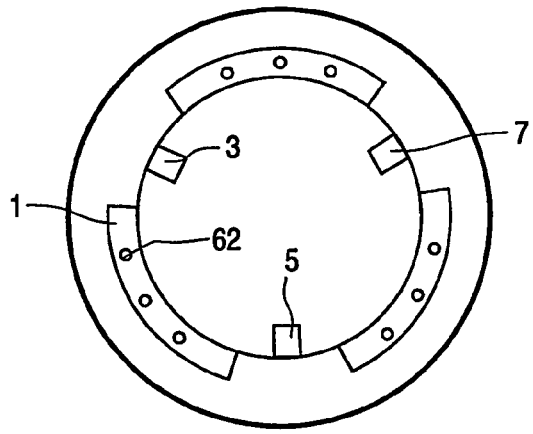
Figure 22:
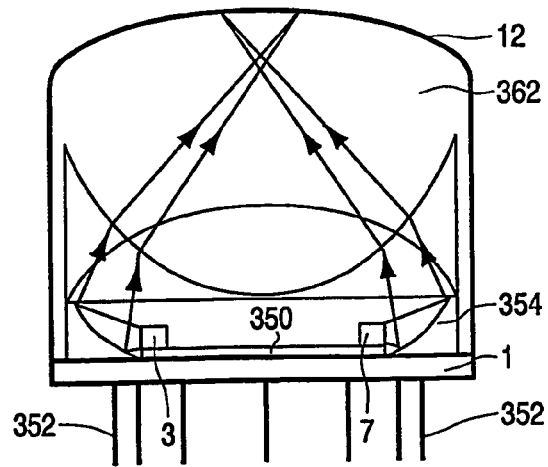
Figure 23A:
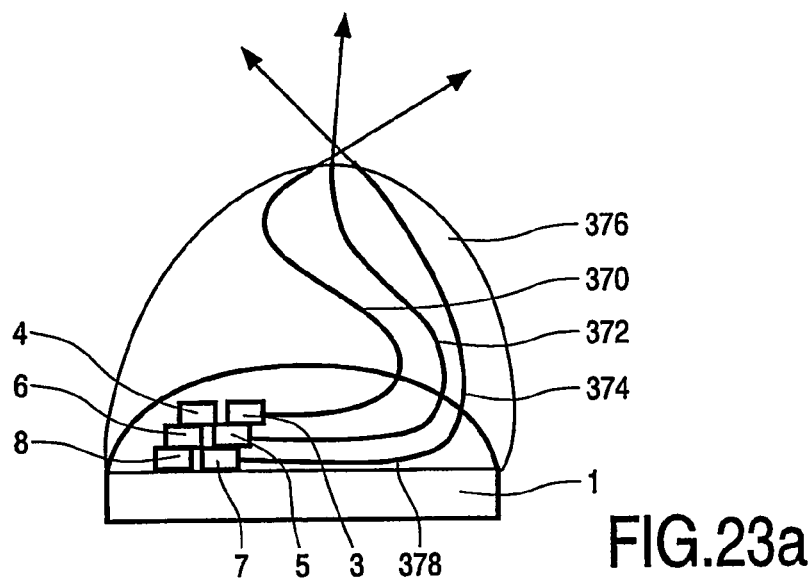
Figure 23B:
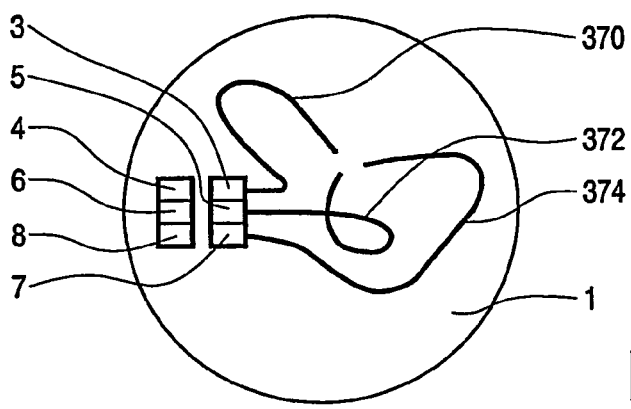
Figure 24:
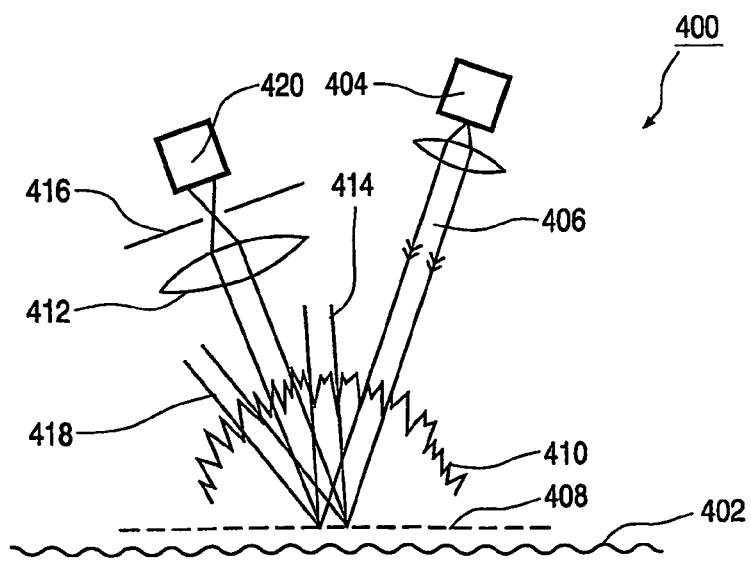
Figure 25:
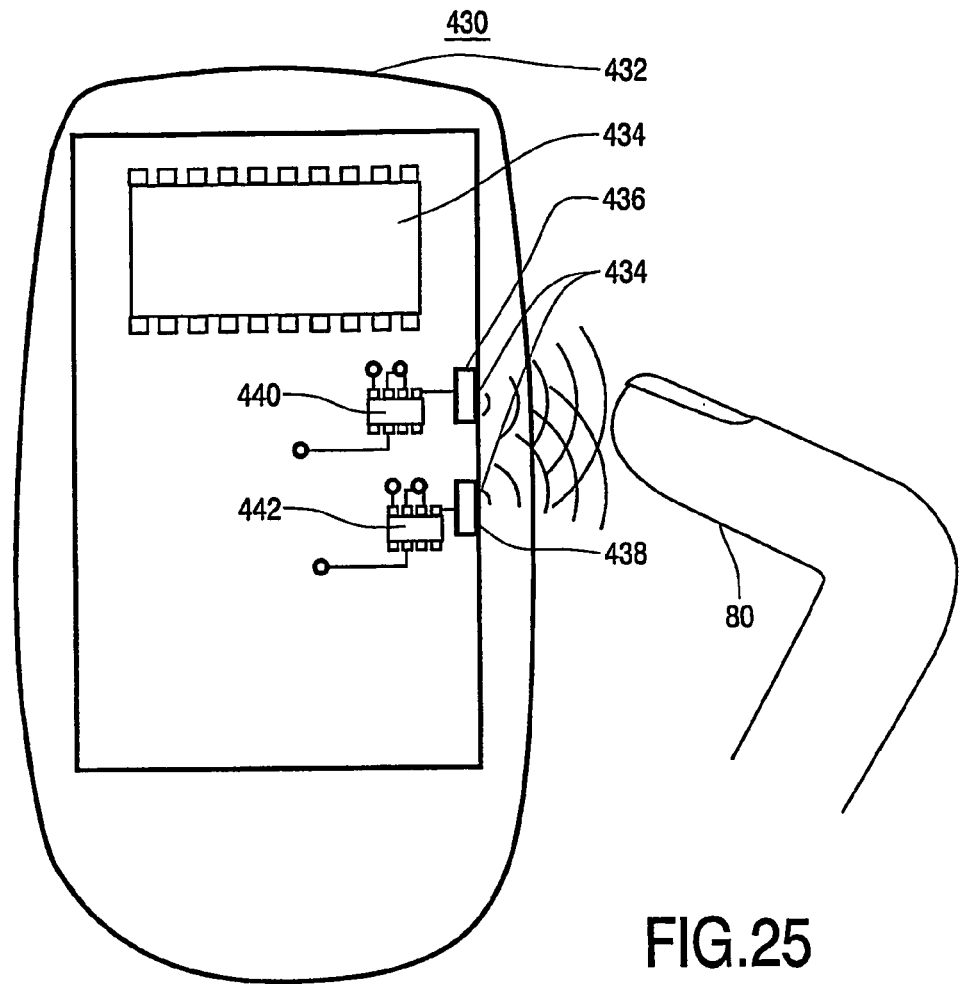
Figure 30:
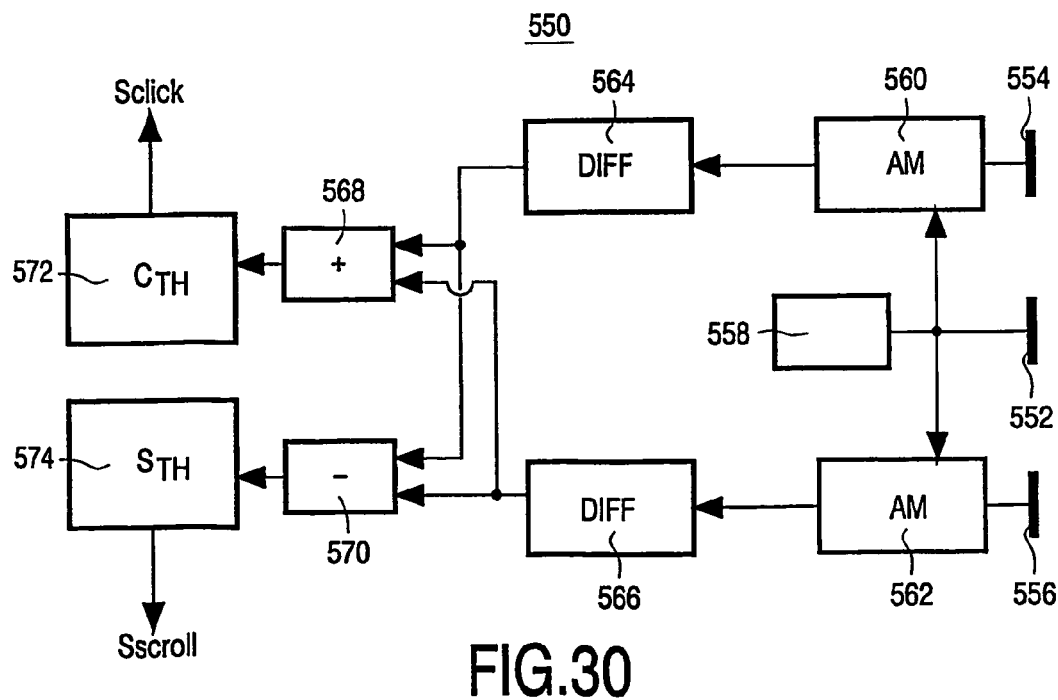
Figure 26:
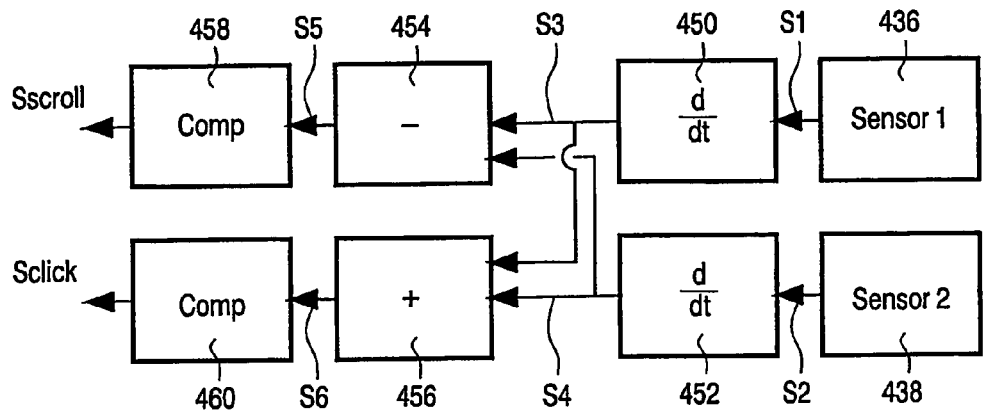
Figure 27:
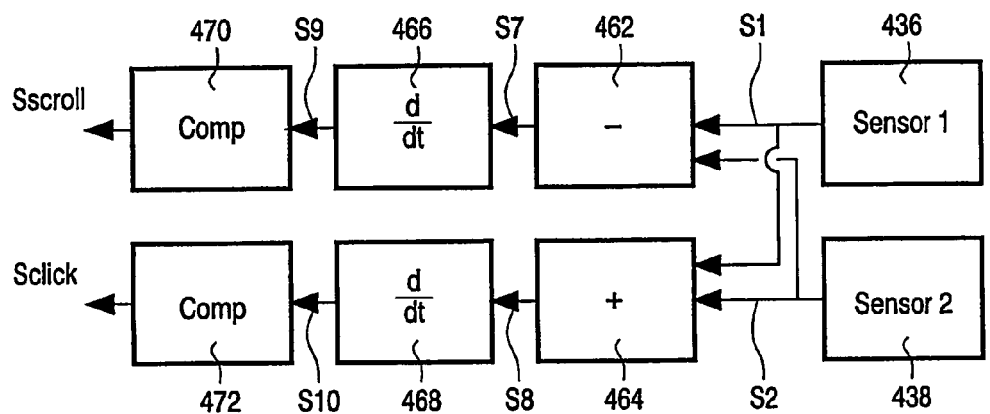
Figure 28:
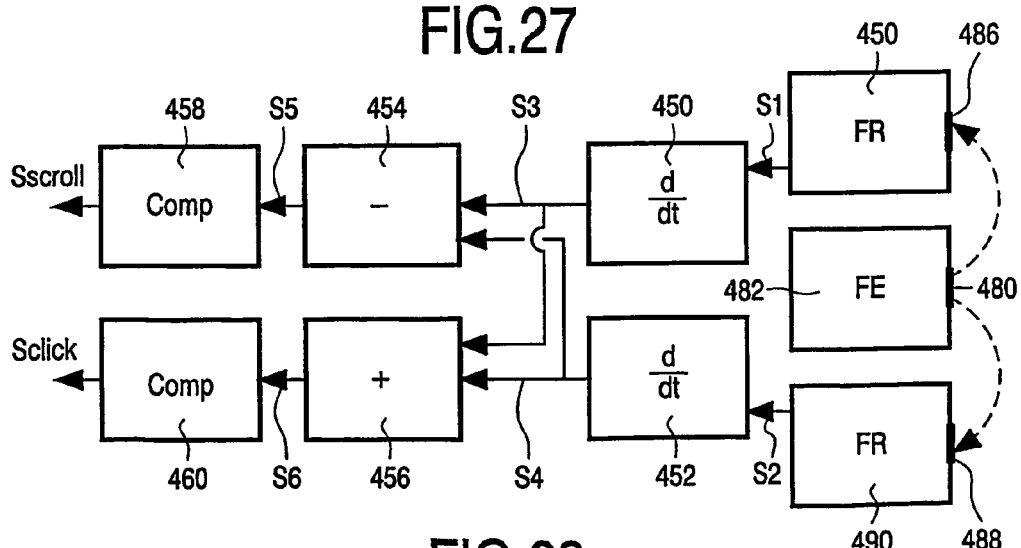
Figure 29:
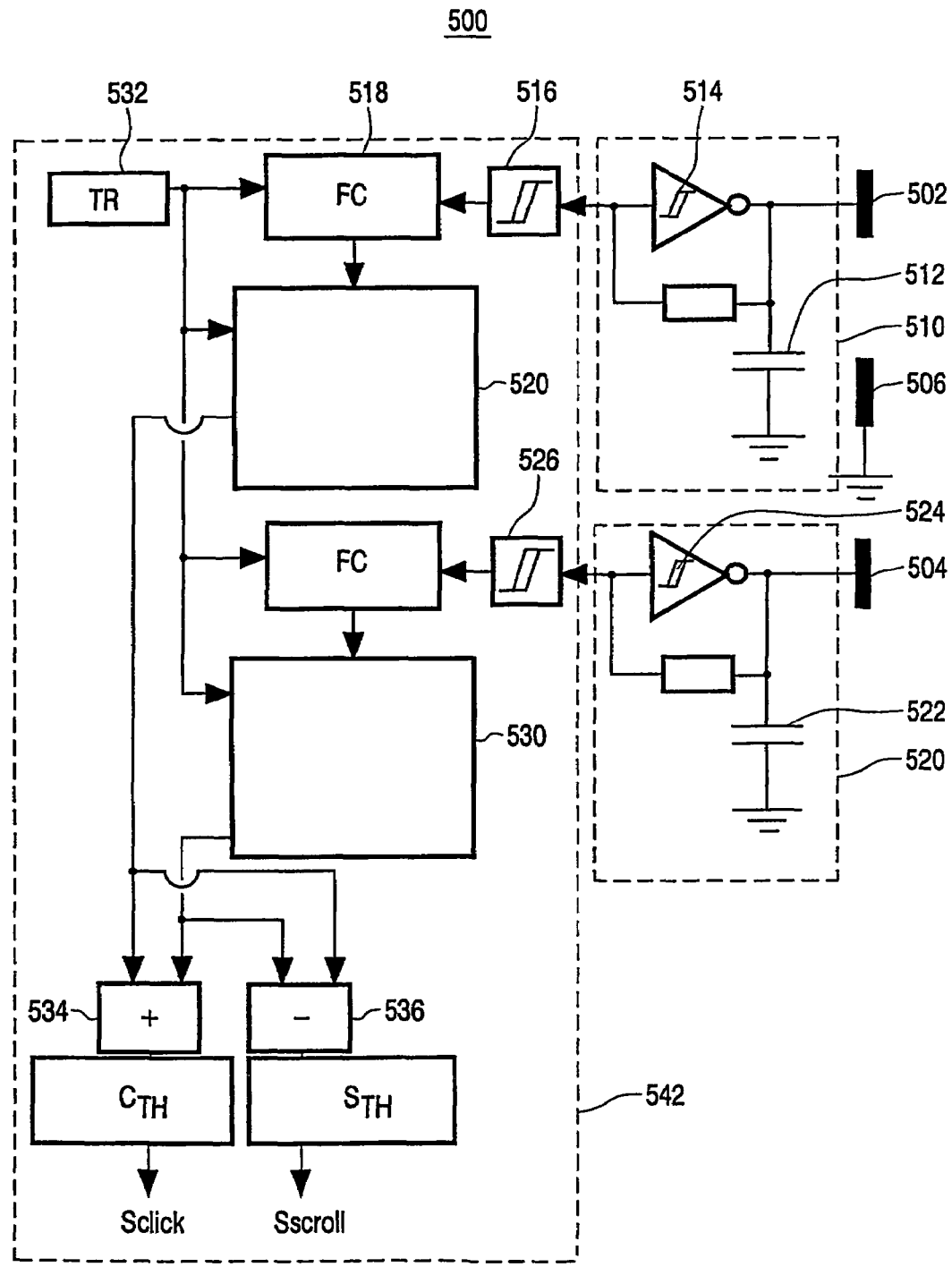
Figure 31:
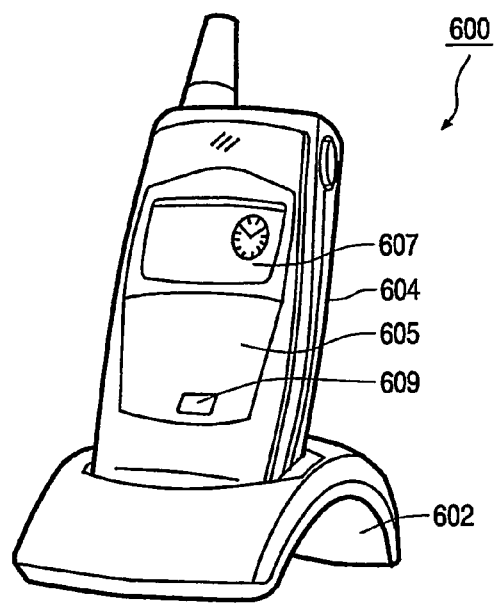
Figure 32:
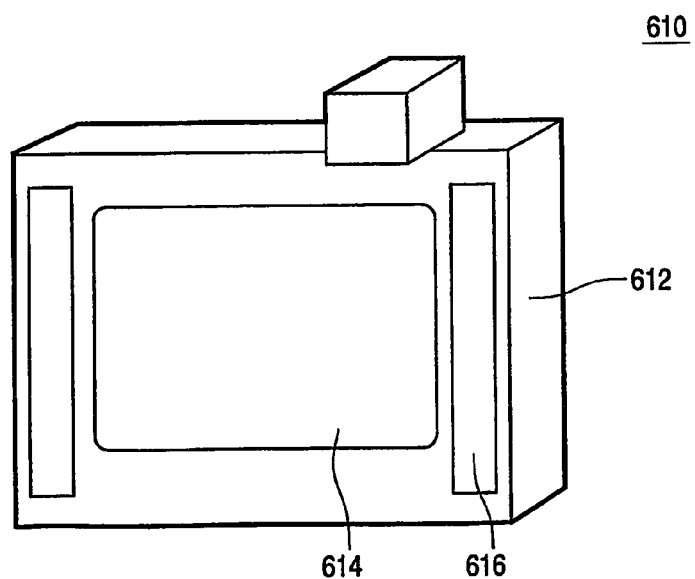
Figure 32:
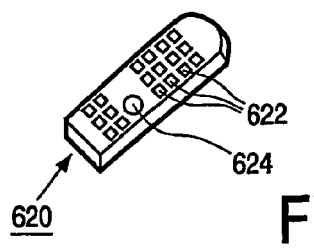
Figure 33:
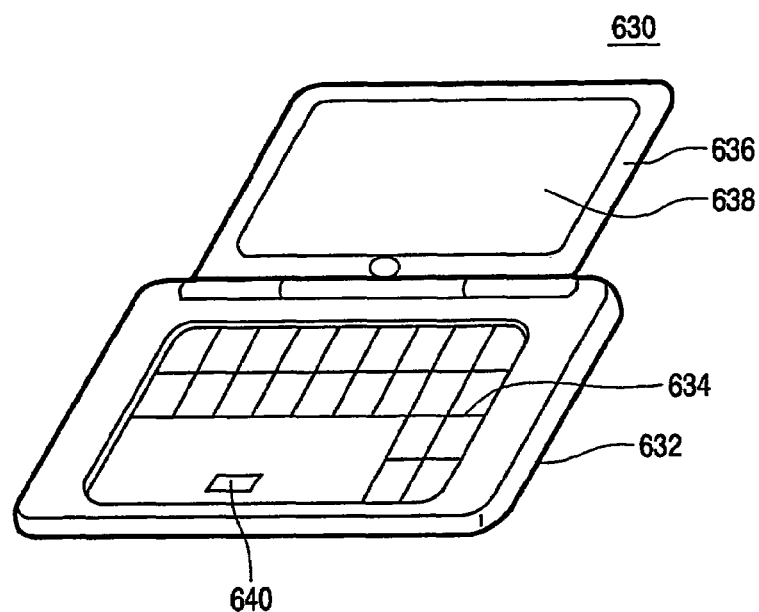
Figure 34:
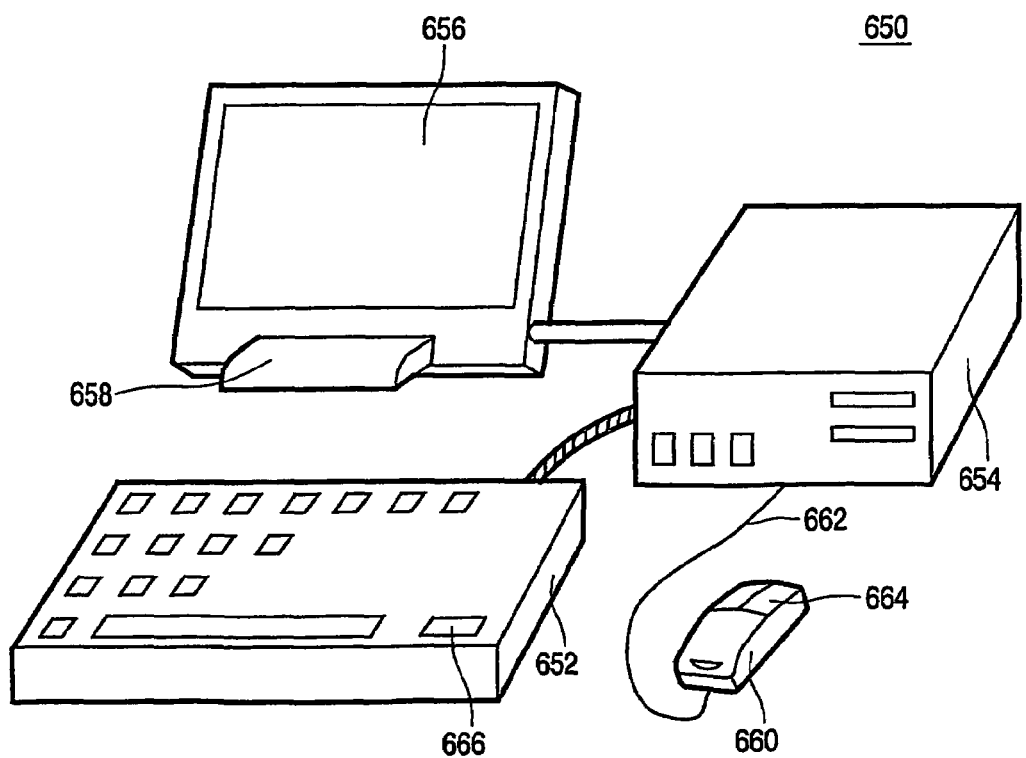

FIGS. 21*a* and 21*b* show the construction of a first embodiment of an input device module;

FIG. 22 shows the construction of a second embodiment of such a module;

FIGS. 23*a* and 23*b* shows the construction of a third embodiment of such a module;

FIG. 24 shows a known optical input device wherein the invention may be implemented;

FIG. 25 shows a mobile phone equipped with a capacitive input device wherein the invention may be implemented;

FIGS. 26-28 show alternative methods of processing signals, generated by this input device, to a click and/or scroll signal;

FIG. 29 shows diagrammatically an embodiment of a signal processor for use in a first embodiment of the capacitive input device;

FIG. 30 shows diagrammatically an embodiment of a signal processor for use in a second embodiment of the capacitive input device;

FIG. 31 shows a cordless phone equipped with an input device wherein the invention may be implemented;

FIG. 32 shows a TV set comprising a remote control equipped with such an input device;

FIG. 33 shows a laptop computer equipped with such an input device;

FIG. 34 shows a desktop computer equipped with such an input device;

FIG. 1*a* is a diagrammatic cross-section of an optical the input device. The device comprises at its lower side a base plate 1, which is a carrier for the diode lasers, in this embodiment lasers of the type VCSEL, and the detectors, for example photo diodes. In FIG. 1*a* only one diode laser 3 and its associated photo diode 4 is visible, but usually at least a second diode laser 5 and associated detector 6 is provided on the base plate, as shown in the FIG. 1*b* top view of the apparatus. The diode lasers 3 and 5 emit laser, or measuring, beams 13 and 17, respectively. At its upper side the device is provided with a transparent window 12 across which an object 15, for example a human finger is to be moved. A lens 10, for example a plane-convex lens is arranged between the diode lasers and the window. This lens focuses the measuring beams 13 and 17 at or near the upper side of the transparent window. If an object 15 is present at this position, it scatters the beam 13. A part of the radiation of beam 13 is scattered in the direction of the measuring beam 13 and this part is converged by the lens 10 on the emitting surface of the diode laser 3 and re-enters the cavity of this laser. As will be explained hereinafter, the radiation returning in the cavity induces changes in this cavity, which results in, inter alia, a change of the intensity of the laser radiation emitted by the diode laser. This change can be detected by the photo diode 4, which may arranged at the back side of the diode laser 3 and which converts the radiation variation into an electric signal, and an electronic circuitry 18 for processing this signal. The measuring beam 17 is also focused on the object, scattered thereby and part of the scattered radiation re-enters the cavity of the diode laser 5. The circuitry 18 and 19, for the signal of the photo diode 6, shown in FIGS. 1a and 1b has only an illustrative purpose and may be more or less conventional. As is illustrated in FIG. 1b, this circuitry is interconnected.

Figure 2:
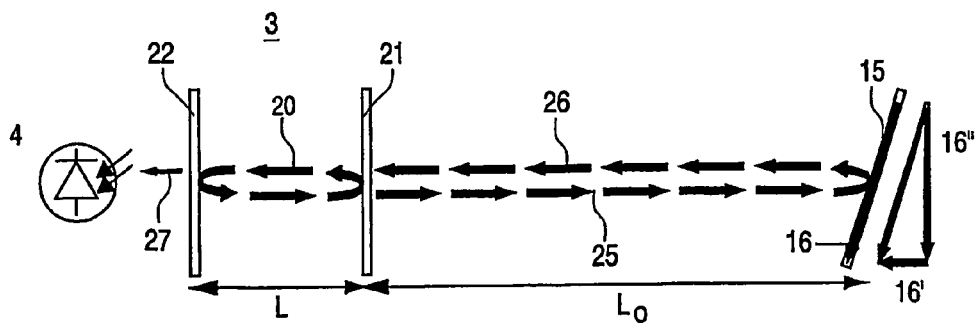
FIG. 2 illustrates the principle of measuring by means of the self-mixing effect.

FIG. 2 illustrates the principle of movement measurement by means of the self-mixing effect. In this FIG., the diode laser, for example diode laser 3, is schematically represented by its cavity 20 whilst its front and rear facets are represented by laser mirrors, 21 and 22, respectively. The cavity has a length L. The object, whose movement is to be measured, is denoted by reference numeral 15. The space between this object and the front facet 21 forms an external cavity, which has a length $L_0$. The laser beam emitted through the front facet is denoted by the reference numeral 25 and the radiation reflected by the object in the direction of the front facet is denoted by reference numeral 26. Part of the radiation generated in the laser cavity passes through the rear facet and is captured by the photo diode 4.

If the object 15 moves in the direction of the measuring beam 25, the reflected radiation 26 has undergone a Doppler shift. This means that the frequency of this radiation changes or that a frequency shift occurs. This frequency shift is dependent on the velocity with which the object moves and is of the order of a few kHz to MHz. The frequency-shifted radiation re-entering the laser cavity interferes with the optical wave, or radiation generated in this cavity, i.e. a self-mixing effect occurs in the cavity. Dependent on the amount of phase shift between the optical wave and the radiation re-entering the cavity, this interference will be constructive or negative, i.e. the intensity of the laser radiation is increased or decreased periodically. The frequency of the laser radiation modulation generated in this way is exactly equal to the difference between the frequency of the optical wave in the cavity and that of Doppler-shifted radiation re-entering the cavity. The frequency difference is of the order of a few kHz to MHz and thus easy to detect. The combination of the self-mixing effect and the Doppler shift causes a variation in the behavior of the laser cavity, especially its gain, or light amplification, varies.

Figure 3:
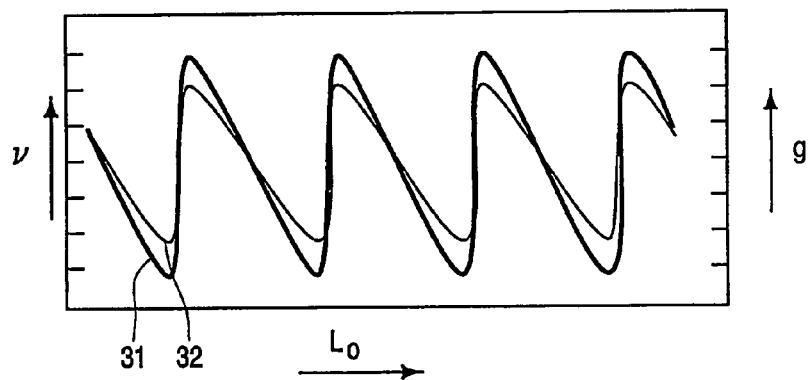
FIG. 3 shows the variation of the optical frequency and of the gain of the laser cavity as a function of the movement of the device and the object relative to each other.

This is illustrated in FIG. 3. In this FIG., curves 31 and 32 represent the variation of the frequency ν of the emitted laser radiation and the variation of the gain g of the diode laser, respectively, as a function of the distance $L_0$ between the object 15 and the front mirror 21. Both ν, g and $L_0$ are in arbitrary units. As the variation of the distance $L_0$ is the result of movement of the object, the abscissa of FIG. 3 can be re-scaled in a time axis, so that the gain will be plotted as a function of time. The gain variation Δg as a function of the velocity v of the object is given by the following equation:

$$\Delta g = -\frac{K}{L} \cdot \cos \cdot \left\{ \frac{4\pi \cdot \upsilon \cdot v \cdot t}{c} + \frac{4\pi \cdot L_0 \cdot t}{c} \right\}$$

In this equation:
K is the coupling coefficient to the external cavity; it is indicative of the quantity of radiation coupled out of the laser cavity;
ν is the frequency of the laser radiation;
v is the speed of the object in the direction of the measuring beam
t is the moment of time, and
c is the light velocity.

The equation can be derived from the theory on the self-mixing effect disclosed in the two Applied Optics articles mentioned herein above. The object surface is moved in its own plane, as is indicated by the arrow 16 in FIG. 2. Because the Doppler shift occurs only for an object movement in the direction of the beam, this movement 16 should be such that it has a component 16' in this direction. Thereby, it becomes possible to measure the movement in an XZ plane, i.e. the plane of drawing of FIG. 2 which movement can be called the X movement. FIG. 2 shows that the object surface has a skew position with respect to the rest of the system. In practice, usually the measuring beam is a skew beam and the movement of the object surface will take place in an XY-plane. The Y-direction is perpendicular to the plane of the drawing in FIG. 2. The movement in this direction can be measured by a second measuring beam, emitted by a second diode laser, and scattered light of which is captured by a second photo diode associated with the second diode laser. A (the) skew illumination beam(s) is (are) obtained by arranging the diode laser(s) eccentrically with respect to the lens 10, as shown in FIG. 1.

Measuring the variation of the laser cavity gain caused by the object movement by measuring the intensity of the radiation at the rear laser facet by a monitor diode is the simplest, and thus the most attractive way. Conventionally, this diode is used for keeping the intensity of the laser radiation constant, but now it is also used for measuring the movement of the object.

Figure 4:
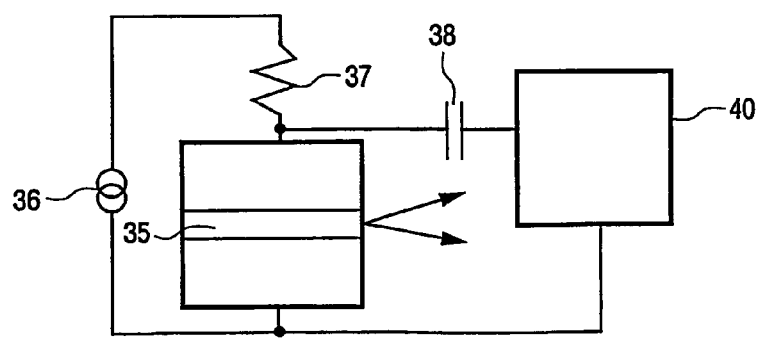
FIG. 4 illustrates a method of measuring this variation.

Another method of measuring the gain variation, and thus the movement of the object, makes use of the fact that the intensity of the laser radiation is proportional to the number of electrons in the conduction band in the junction of the laser. This number in turn is inversely proportional to the resistance of the junction. By measuring this resistance, the movement of the object can be determined. An embodiment of this measuring method is illustrated in FIG. 4. In this Figure, the active layer of the diode laser is denoted by the reference numeral 35 and the current source for supplying this laser is denoted by reference numeral 36. The voltage across the diode laser is supplied to an electronic circuit 40 via a capacitor 38. This voltage, which is normalized with the current through the laser, is proportional to the resistance, or impedance, of the laser cavity. The inductance 37 in series with the diode laser forms high impedance for the signal across the diode laser.

Besides the amount of movement, i.e. the distance across which the object is moved and which can be measured by integrating the measured speed with respect to time, also the direction of movement has to be detected. This means that it has to be determined whether the object moves forward or backward along an axis of movement. A first method to determine the direction of movement uses the shape of the signal resulting from the self-mixing effect. As shown by graph 32 in FIG. 3, this signal is an asymmetric signal. The graph 32 represents the situation where the object 15 is moving towards the laser. The rising slope 32' is steeper than the falling slope 32". As described in the above-mentioned article in Applied Optics, Vol. 31, No. 8, 20 Jun. 1992, pages 3401-3408, the asymmetry is reversed for a movement of the object away from the laser, i.e. the falling slope is steeper than the rising slope. By determining the type of asymmetry of the self-mixing signal, the direction of movement of the object can be ascertained.

Figure 5:
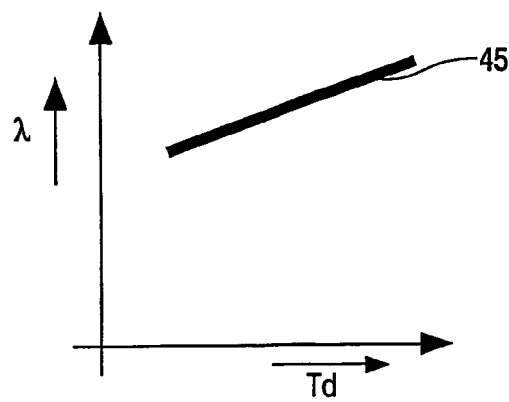
FIG. 5 shows the variation of laser wavelength as a function of the temperature of a laser.

Under certain circumstances, for example for a smaller reflection coefficient of the object or a larger distance between the object and the diode laser, it may become difficult to determine the shape or asymmetry of the self-mixing signal. Therefore, a second method of determining the direction of movement may be preferred. The second method uses the fact that the wavelength λ of the laser radiation is dependent on the temperature of, and thus the current through, the diode laser. If, for example, the temperature of the diode laser increases, the length of the laser cavity increases and the wavelength of the radiation that is amplified increases. Curve 45 of FIG. 5 shows the temperature ($T_d$) dependency of the wavelength λ of the emitted radiation. In this Figure, both the horizontal axis, $T_d$, and the vertical axis, λ, are in arbitrary units.

Figure 6:
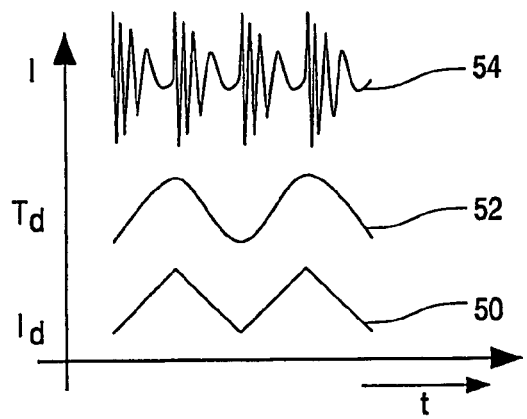
FIG. 6 shows the effect of the use of a periodically varying drive current for a laser.

If, as is shown in FIG. 6, a periodic drive current $I_d$, represented by the graph 50, is supplied to the diode laser, the temperature $T_d$ of the diode laser rises and falls periodically, as shown in graph 52. This results in a standing optical wave in the laser cavity which has a periodically varying frequency and thus a continuously varying phase shift with respect to the radiation reflected by the object and re-entering the cavity with a certain time delay. In every half period of the drive current, there are now successive time segments wherein the diode laser gain is alternating higher and lower, depending on the phase relation of the wave in the cavity and the reflected radiation re-entering the cavity. This results in a time-dependent intensity variation (I) of the emitted radiation as shown in graph 54 of FIG. 6. This graph represents the situation for a stationary, or non-moving, object. The number of pulses in a first half period ½ p(a) is equal to the number of pulses in a second half period ½ p(b).

A movement of the object causes a Doppler shift of the radiation re-entering the laser cavity, i.e. this frequency increases or decreases dependent on the direction of movement. A movement of the object in one direction, the forward direction, causes a decrease of the wavelength of the re-entering radiation, and a movement in the opposite direction causes an increase in the wavelength of this radiation. The effect of the periodic frequency modulation of the optical wave in the laser cavity is as follows. In case the Doppler shift has the same sign as the frequency modulation in the laser cavity, the effect of Doppler-shifted radiation re-entering the cavity is different from the effect this radiation has in case said frequency modulation and Doppler shift have opposite signs. If the two frequency shifts have the same sign, the phase difference between the wave and the re-entering radiation changes at a slow rate, and the frequency of the resulting modulation of the laser radiation is lower. If the two frequency shifts have opposite signs, the phase difference between the wave and the radiation changes at a faster rate, and the frequency of the resulting modulation of the laser radiation is higher. During a first half period, ½ p(a), of the driving laser current, the wavelength of the generated laser radiation increases. In case of a backward moving object, the wavelength of the re-entering radiation also increases, so that the difference between the frequencies of the wave in the cavity and that of the radiation re-entering this cavity is lower. Thus the number of time segments during which the wavelength of re-entering radiation is adapted to the wavelength of the generated radiation is smaller than in the case of absence of electrical modulation of the emitted laser radiation. This means that, if the object moves in the backward direction, the number of pulses in the first half period is smaller than if no modulation would be applied. In the second half period, ½ p(b), wherein the laser temperature and the wavelength of the generated radiation decrease, the number of time segments wherein the wavelength of the re-entering radiation is adapted to that of the generated radiation increases. Thus, for a backward moving object, the number of pulses in the first half period is smaller than the number of pulses in the second half period. This is illustrated in graph 58 of FIG. 7, which graph shows the intensity $I_b$ of the laser radiation emitted if the object moves in the backward direction. Comparing this graph with graph 54 of FIG. 6 shows that the number of pulses in the first half period has decreased and the number of pulses in the second half period has increased.

Figure 7:
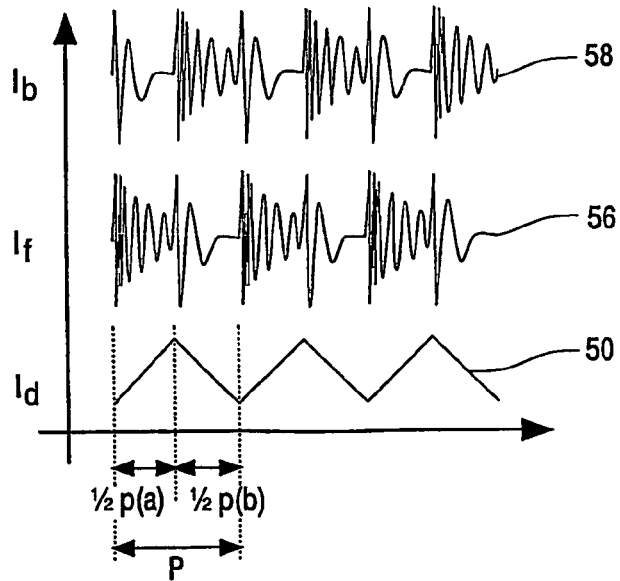
FIG. 7 illustrates how the direction of movement is detected.

It will be clear from the above explanation that if the object moves in the forward direction, in which the wavelength of radiation scattered by the object and re-entering the laser cavity decreases due to the Doppler effect, the number of pulses in a first half period ½ p(a) is larger than the number of pulses in a second half period ½ p(b). This can be verified by comparing graph 56 of FIG. 7, representing the intensity $I_f$ of the radiation emitted in the case of a forward moving object. In an electronic processing circuit, the number of photo diode signal pulses counted during the second half period ½ p(b) is subtracted from the number of pulses counted during the first half periods ½ p(a). If the resulting signal is zero, the object is stationary. If the resulting signal is positive, the object moves in the forward direction and if this signal is negative, the object moves in the backward direction. The resulting number of pulses is proportional to the velocity of the movement in the forward and backward directions, respectively.

Under certain circumstances it may occur that the number of pulses generated by the Doppler effect is higher than the number of pulses generated by the electrical modulation. This may happen, for example, if the optical path length between the laser and the object is relatively small and the frequency and amplitude of the electrical modulation are relatively small, whereas the movement to be detected is relatively fast. In such situations the direction of movement can still be detected by comparing the number of pulses during a first half period with the number of pulses during a second half period. However, the velocity is then not proportional to the difference of these two numbers. In order to determine the velocity in such situations, the said two numbers should be averaged and a constant value should be subtracted from the result. The number obtained in this way is a measure for the velocity. A person skilled in the art can easily design an electronic circuit for carrying out this calculation.

Instead of the triangular shaped drive current $I_d$ used in the embodiment described with reference to FIGS. 5 and 6, also a drive current of another shape, such as sinusoidal or rectangular shape, may be used.

The method of measuring the velocity and the direction of the object movement described above can also be used if the gain variation is determined by measuring the variation of the resistance of the diode laser cavity.

The measuring method requires only a small Doppler shift, for example in terms of wavelength, a shift of the order of $1,5.10^{-16}$ m, which corresponds to a Doppler frequency shift of the order of 100 kHz for a laser wavelength of 680 nm.

Figure 8:
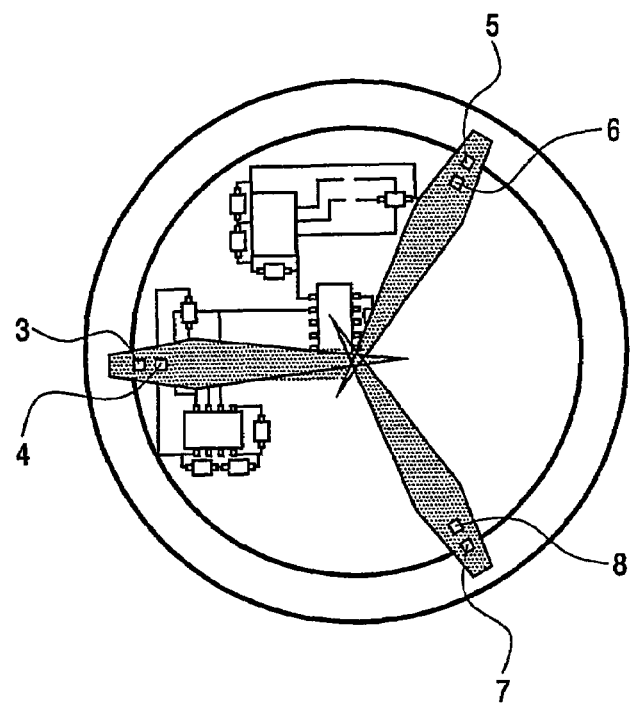
FIG. 8 shows a diagram of an input device with three measuring axes.

The input device of FIG. 1, which comprises two diode lasers and two associated photo diodes in a perpendicular orientation, allows measurement of the object movement along two perpendicular (X and Y) directions, or measuring axis, in one plane. Such a device is suitable for an apparatus wherein the movement of a cursor across in two directions across a display has to be controlled. If in such an apparatus also a click action has to be measured, a third diode laser and an associated photo diode has to be added to the device. The third diode laser and photo diode enables this device to measure also the movement along a third, Z-, direction, or measuring axis. The third diode laser may be arranged on the optical axis of the lens 10 so that the third measuring beam is perpendicularly incident on the window 12 and the object and has no components in the other directions. An optimum measuring signal for the Z direction may then be obtained. In order to increase the reliability and accuracy of the X and Y measuring signals, three diode lasers are preferably arranged on one circle and at a mutual angular distance of 120°. This configuration is shown in FIG. 8 wherein the third diode laser and third photo diode are denoted by the reference numerals 7 and 8, respectively. If the output signals of the photo diodes 4, 6 and 8, or the resistance measuring signals, are represented by $S_4$, $S_6$ and $S_8$ respectively, the object velocities $V_x$, $V_y$ and $V_z$ along the X, Y and Z measuring axes, respectively can be calculated, for example, as follows:

$$V_x = 2S_4 - S_6 - S_8$$

$$V_y = \sqrt{3}.(S_8 - S_6)$$

$$V_z = 1/\sqrt{2}.(S_4 + S_6 + S_8)$$

The electronic circuit for performing this calculation comprises summing and subtracting elements and is relatively easy to implement.

The values of the velocities and, by integration over the time, the movement, the distance of the movement in the X and Y directions obtained in this way are more reliable and accurate, because they are the result of averaging the output signals of at least two photo diodes. Movement errors, or unwanted movements, such as slightly lifting the finger, have a similar effect on the output signals of the photo-diodes. As the movements along the X and Y measuring axes are determined by subtracting output signals from each other, the influence of an unwanted movement on the X- and Y measuring signal is eliminated. Only the Z-measuring signal, $V_z$, which is obtained by adding the output signals of the three photo diodes is indicative of an up/down movement of the finger, or another object.

For determining a click action it suffices to detect that such a movement takes place and an accurate measurement of the displacement of the object is not necessary so that the Z-measurement may be rather rough.

A proper arrangement of the diode lasers, and thus the measuring beams, relative to the device window and a proper processing of the signals of the photo diodes allow measurement in the X-, Y- and Z direction by means of an input device having only two diode lasers. This input device can be used in an apparatus having menu chart scrolling and clicking facilities. Such an input device, which may be called an optical scroll-and-click device, can be easily built of discrete components, which allows new developments to be fast made.

Figure 9:
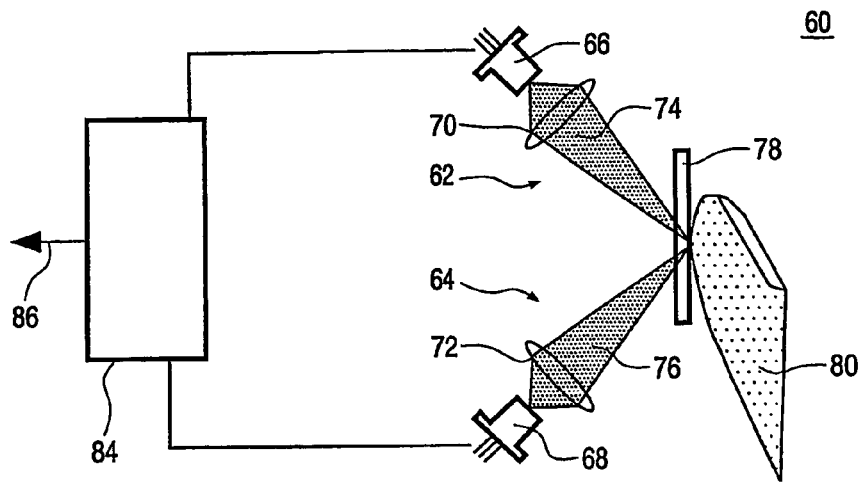
FIG. 9 shows a first embodiment of a scroll-and-click optical input device.
Figure 10:
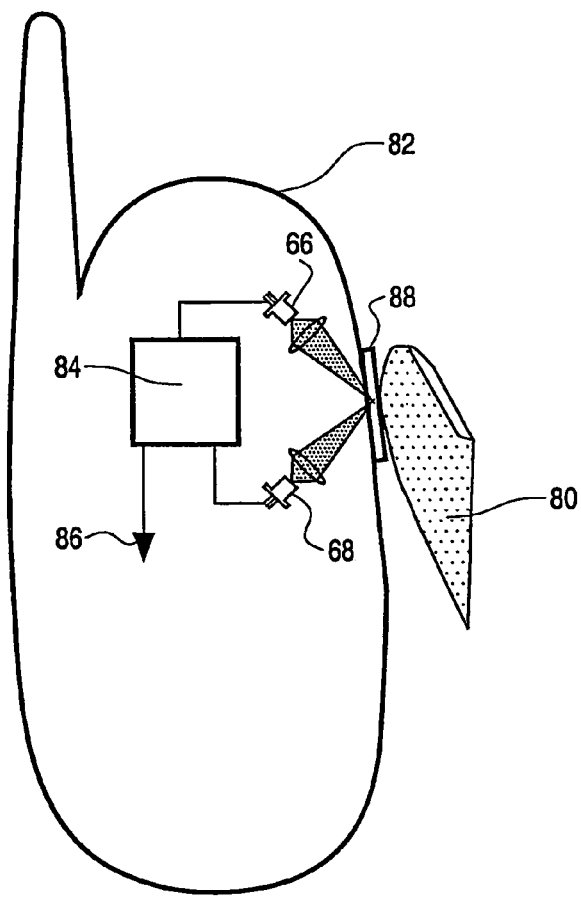
FIG. 10 shows a mobile phone equipped with such a device.

FIG. 9 shows a first embodiment of an optical scroll-and-click input device 60. It comprises two optical sensor units 62,64, each of which may comprise a diode laser and photo-diode assembly 66,68. Instead of such an assembly, also separate diode lasers and photo diodes may be used. In each of the paths of the radiation emitted by the units 62,64 a lens 70, 72 is arranged, which focuses radiation beams 74,76 of the associated units 62,64 in an action plane 88, which may be the plane of a window. This window 78 may form part of the housing 82 of the apparatus in which the device is used, for example a mobile phone as shown in side view in FIG. 10. The sensor units may be arranged such that the chief rays of the measuring beams 74,76 are at opposite angles with respect to the normal to the window 82, to for example at angles of +45° and −45°, respectively.

An object, for example a human finger 80 is moved across the action plane for a scrolling and/or clicking action. As described herein above, both actions cause a Doppler shift in the radiation reflected by the finger towards the laser/diode assemblies units 66, 68. The output signals of the detectors of these units are supplied to signal processing and laser drive electronic circuitry 64. This circuitry evaluates the movements of, for example the controlling finger 80 and supplies information about these movements at its output 86. The sensor units 62,64, the window 88 and the electronic circuitry 84 and software may be integrated in one module. This module is placed as such in the mobile phone or in another apparatus, which should be provided with a scrolling and clicking function. It is also possible to implement the input device with discrete elements. Especially part of the signal processing may be carried out by a micro controller or other controlling means which forms part of the mobile phone or other apparatus, such as a remote control, a cordless phone or a portable computer.

As described herein before a movement of a finger or other with respect to the sensor units may be detected by modulating the laser currents and counting the pulses received by the detectors. From the output signals $Sign_1$ and $Sign_2$ of these detectors, which represent velocities of the object along the chief rays of the measuring beams 74,76, the velocity ($V_{scroll}$) parallel to the window and the velocity ($V_{click}$) perpendicular to the window can be calculated as follows:

$$V_{scroll} = \frac{1}{2}\sqrt{2}.(Sign_1 - Sign_2)$$

$$V_{click} = \frac{1}{2}\sqrt{2}.(Sign_1 + Sign_2)$$

Figure 11:
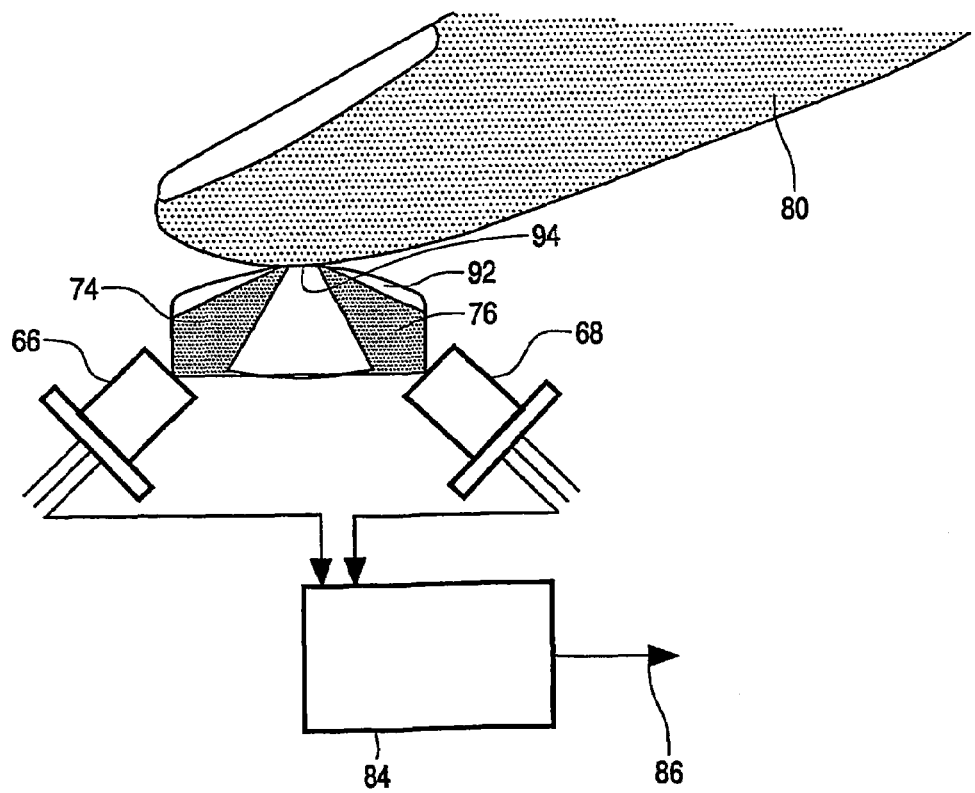
FIG. 11 shows a second embodiment of a scroll-and-click optical input device.

FIG. 11 shows a second embodiment of a scroll-and-click-input device 90. This embodiment differs from that of FIGS. 9 and 10 in that the two lenses 70,72 and the window 88 have been replaced by a single component 92. This element focuses both beams 74,76 on its upper surface 94, which forms a window.

As described thus far, scroll and click actions are determined by means of a vector transform of all available directional information, i.e. the signals of all detectors present in the input device. Under circumstances it may be difficult to discriminate between a scroll action and a click action and to distinguish between a forward and back movement in a scroll action and a click action. The latter may be the case especially when the device is further miniaturized and the signal to noise ratio of the sensor signals reduced. The present invention provides a method to solve these problems and moreover allows reducing the number of diode lasers in the device. The latter means that a considerable cost and space reduction can be realized. The new method uses the time-dependent characteristics of the signals generated during a scroll action and a click action as well as historical data of preceding actions to obtain a more reliable signal interpretation. By means of the historical date a probability check can be performed such that a vague signal can be well interpreted as yet.

Starting points for the new methods are the following facts:
a user will never scroll and click at the same time, and
the time-dependent characteristic of a scroll action is substantially different from the characteristic of a click action.

These facts can be incorporated in the software by means of which the sensor signals are interpreted, which software forms part of the input device and/or the apparatus wherein the input device is embedded. The first fact means that cross talk between a deliberate scroll action and a deliberate click action is not possible. The second fact is illustrated in FIGS. 12 and 13.

Figure 12:
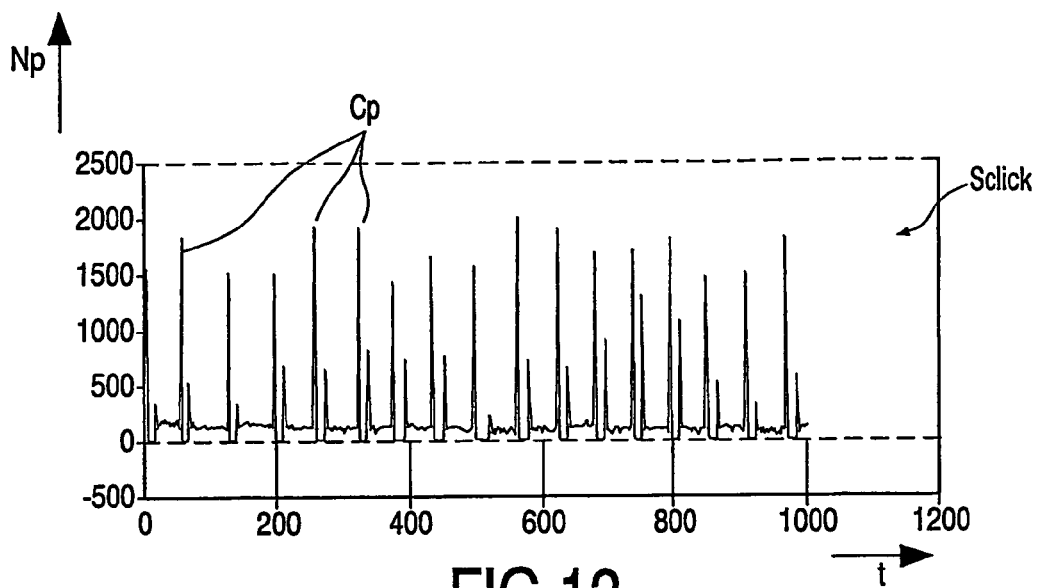
FIG. 12 shows a time pattern of a signal, which is typical for a click action.

FIG. 12 shows a click signal $S_{click}$ supplied by a scroll-and-click device, which uses the self-mixing effect. The horizontal axis is the time (t) axis and along the vertical axis the total number of laser pulses Np during a click action are plotted.

Typically for a click action is that before clicking the user reduces the scrolling speed and finally stops scrolling when the desired position is reached. Then the fast clicking action is performed, where after a period of non-movement follows. Each fast clicking action results in a large number of diode laser pulses, thus in a peak Cp of the signal $S_{click}$, as can be taken from FIG. 12, which shows a number of such peaks as a result of a corresponding number of click actions performed one after the other. The signal pattern shown in FIG. 12 is the general click pattern that will always occur and is not different for different users and not different for an up-click or down-click made by the user.

Figure 13:
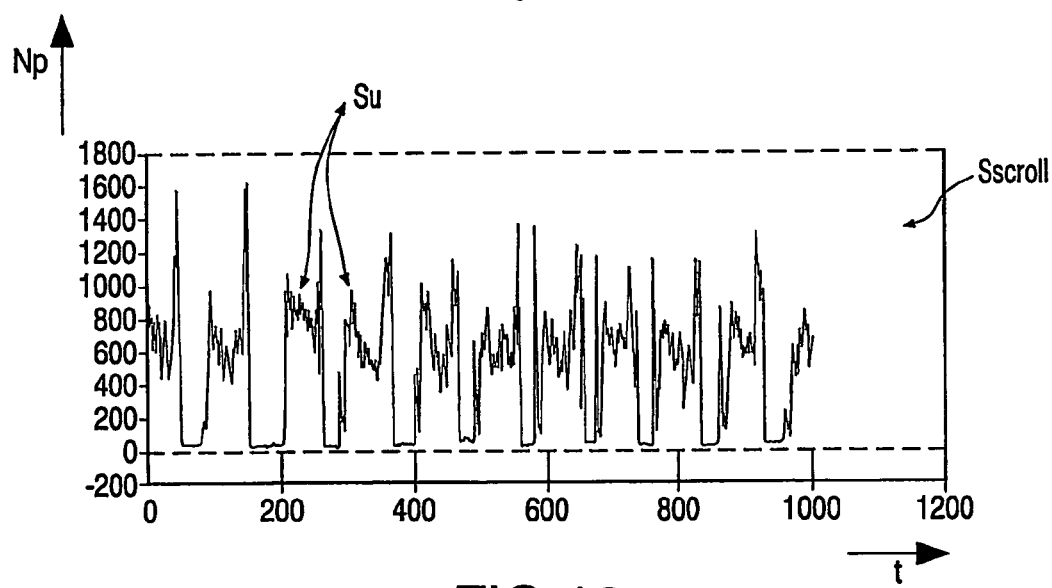
FIG. 13 shows a time pattern of a signal, which is typical for a scroll action.

FIG. 13 shows a scroll signal $S_{scroll}$ supplied by the same input device when a number of scroll action are performed one after the other. During one scroll action the finger is permanently moved. As the velocity is usually not constant, at different time intervals during the duration of the scroll action the number of diode laser pulses is different. This results in an undulated (Su) scroll signal for each scroll action. This signal has also peaks Sp, but now and the beginning and the end of a scroll action and these peaks are generally lower than the peaks of the click signal of FIG. 12.

A comparison of the graphs $S_{click}$ of FIG. 12 and $S_{scroll}$ of FIG. 1 learns that a click action generates a sensor signal that is substantially different from the sensor signal generated by a click action. The different time characteristics of these signals can be detected, and thus discrimination made between a click action and a scroll action, by means of an additional algorithm. This algorithm is embedded in the software of the input device, which software is stored in the signal processor of this device or in the microprocessor of the apparatus.

For a scroll action two parameters are of interest: the speed, which has only a positive value, and the direction of scrolling, which may have a positive (up-scroll) or a negative value (down-scroll). At regular time intervals, for example every ten milliseconds, during the actions, scroll or click, the signal processor takes in the detector signals and calculates, by proper combining these signals, numerical values for the speed and the direction. The signal processor takes in both signals generated by the detectors during the warming-up phases of the associated diode lasers and signals generated during the cooling-down phases of the diode lasers. These phases are shown in FIG. 6 (graph 52). As described in the hand of FIGS. 6 and 7 the number of laser pulses during these phases, called half periods there, depends on the speed of the object (finger) and the direction of object movement. This holds also for output pulses the detectors supply during these phases, which output pulses are counted by a separate counter for each detector. Such a counter will thus supply different values during said phases when a scrolling action takes place, whereby the difference between these values is indicative for the scrolling direction.

Figure 14:
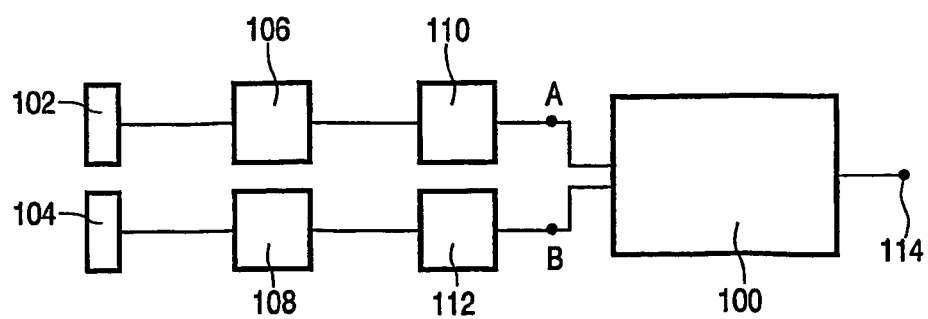
FIG. 14 shows diagrammatically an electronic processor for processing signals, generated by device detectors, to a click and/or scroll signal.

FIG. 14 shows, diagrammatically, two detectors 102,104 and some components of the signal processor 84 in detail. Reference numerals 110 and 112 denote counters for counting the pulses from the detector 110 and 112, respectively. The counter output values A, B, which are numerical values are supplied to a calculator 100. Between a detector and a counter a amplifier 106,108 may be arranged to amplify the detector signal. At each moment of sampling, for example every ten milliseconds, the values of A and B obtained during said two half periods are added to and subtracted from each other to obtain the momentarily velocity and direction of the object movement.

In general, satisfactorily results are obtained in this way. However if one wishes to further miniaturize the input device the influence of noise on the detector signals will increases and the difference between the signals during the two half periods will become more difficult to detect. This means that the reliability of the output 114 of the calculator will decrease. However reliable information about the velocity and direction of a scroll action and about a click action can still be obtained from less reliable measuring signal when use is made of the facts that:

a user will not change the scroll direction more than once within a certain tome period, and when the scroll direction is changed the speed is low, mathematically speaking the speed is zero for an infinitely short time interval. Information about user's input at other time intervals, before and after the time interval that is actually analyzed can be used to interpret the sensor signal obtained during said actual time interval to obtain reliable information about the direction of a scroll movement at the actual time interval.

As the new method does not use a vector decomposition technique to distinguish between a scroll action and a click action, this method allows measuring these actions by means of only one optical sensor unit.

Figure 15:
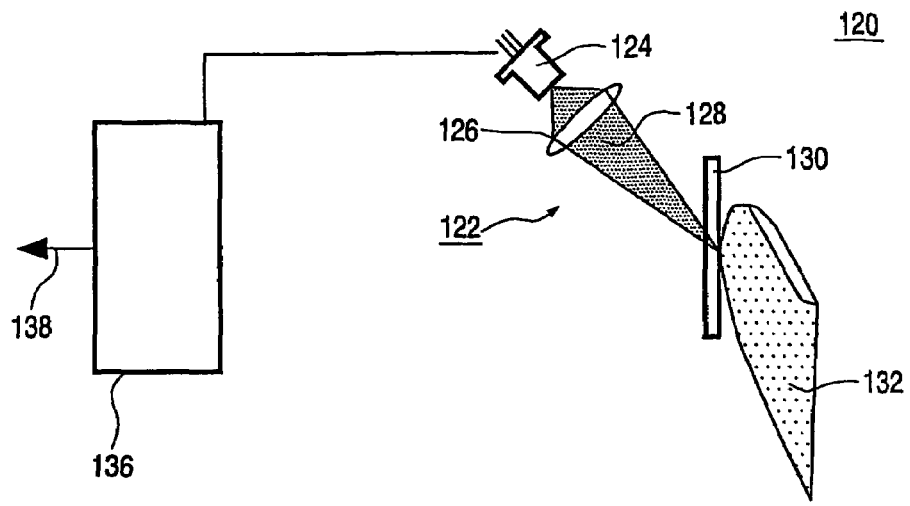
FIG. 15 shows an optical scroll-and-click device with only one diode laser.
Figure 16:
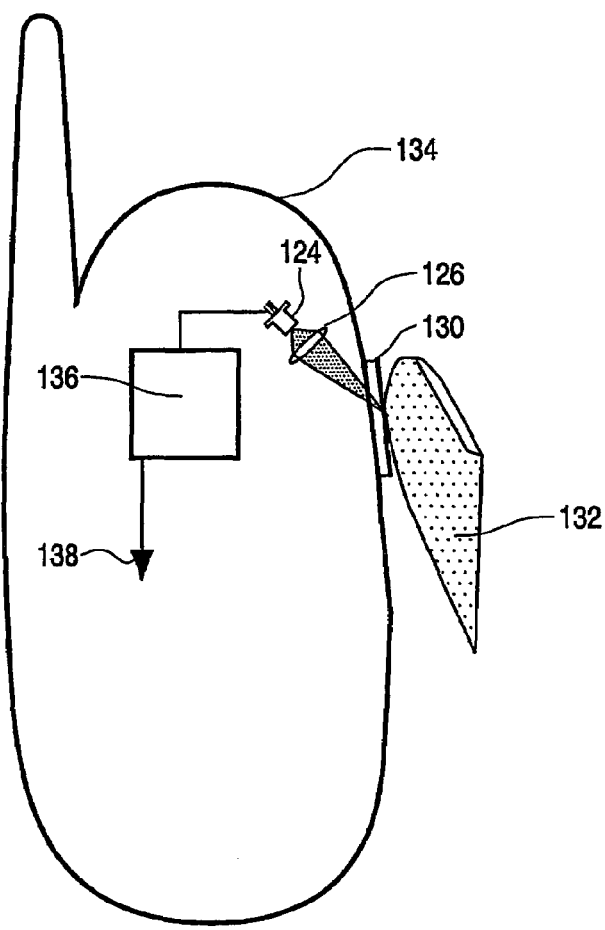
FIG. 16 shows a mobile phone equipped with such a device.

FIG. 15 diagrammatically shows an embodiment of an optical scroll-and-click device 120 comprising only one optical sensor unit 122 and FIG. 16 shows a side view of a mobile phone wherein such a device may be implemented. The sensor unit may comprise a diode laser and photo diode assembly 124 and a lens 126 to focus the measuring beam 128 in the plane of the device window 130 across which a finger 132 is moved, or in the neighborhood of this window. The device further comprises a laser driving and signal detecting circuitry 136, which may comprise software wherein algorithms discussed here may be embedded. The software may also be arranged in the microprocessor of the apparatus of which the input device forms part. Reference number 138 denotes the device output and/or an interface to control external functions, for example relating to mobile phone menus.

As the chief ray of the measuring beam is incident at a sharp angle on the window 130 and the finger surface, the single sensor unit 122 can measure a movement parallel (scroll action), as well as a movement perpendicular (click action) to the window. In this device a click action is detected not by determining the component of a finger movement in the direction perpendicular to the window, but by analyzing the time characteristic of the detector signal.

Also in an input device for measuring movement of an object in three directions (X-, Y-scroll and click) and wherein in principle three sensor units are used, one for each direction, one sensor unit can be saved when using this method. Saving a sensor unit, especially a diode laser may be of great importance in practice, because a diode laser is the most costly component of the input device. Moreover saving a sensor unit means that the device can be made more compact and that it can be easier built-in in the envisaged apparatus. It is also possible to use the new method with an input device having the original number of sensor units. One of the sensor units can be used for measuring movement along two directions and the sensor unit, which originally measured along one of these directions is now available to produce additional information.

Now some embodiments of algorithms, by means of which the method can be performed, will be described. FIGS. 17-20 show block diagrams of algorithms by means of which one scroll action (X or Y) and a click action can be determined. Each of these algorithms has the capability to store data about user's input, or action, in the past, i.e. before the actual measuring and analyzing time interval and use these date at this interval. In the following a user's action will be called an event. An algorithm may store either the complete data, which were obtained when the state of the input device was checked during the last n events preceding the actual one. The algorithm may also store only data relating to processed information, such as the time expired since the last event (click or scroll movement) was detected. An algorithm may, in addition thereto, also use data about events, which follow the time interval that is momentarily analyzed. This can be realized by processing the input signals after some time delay.

Figure 17:
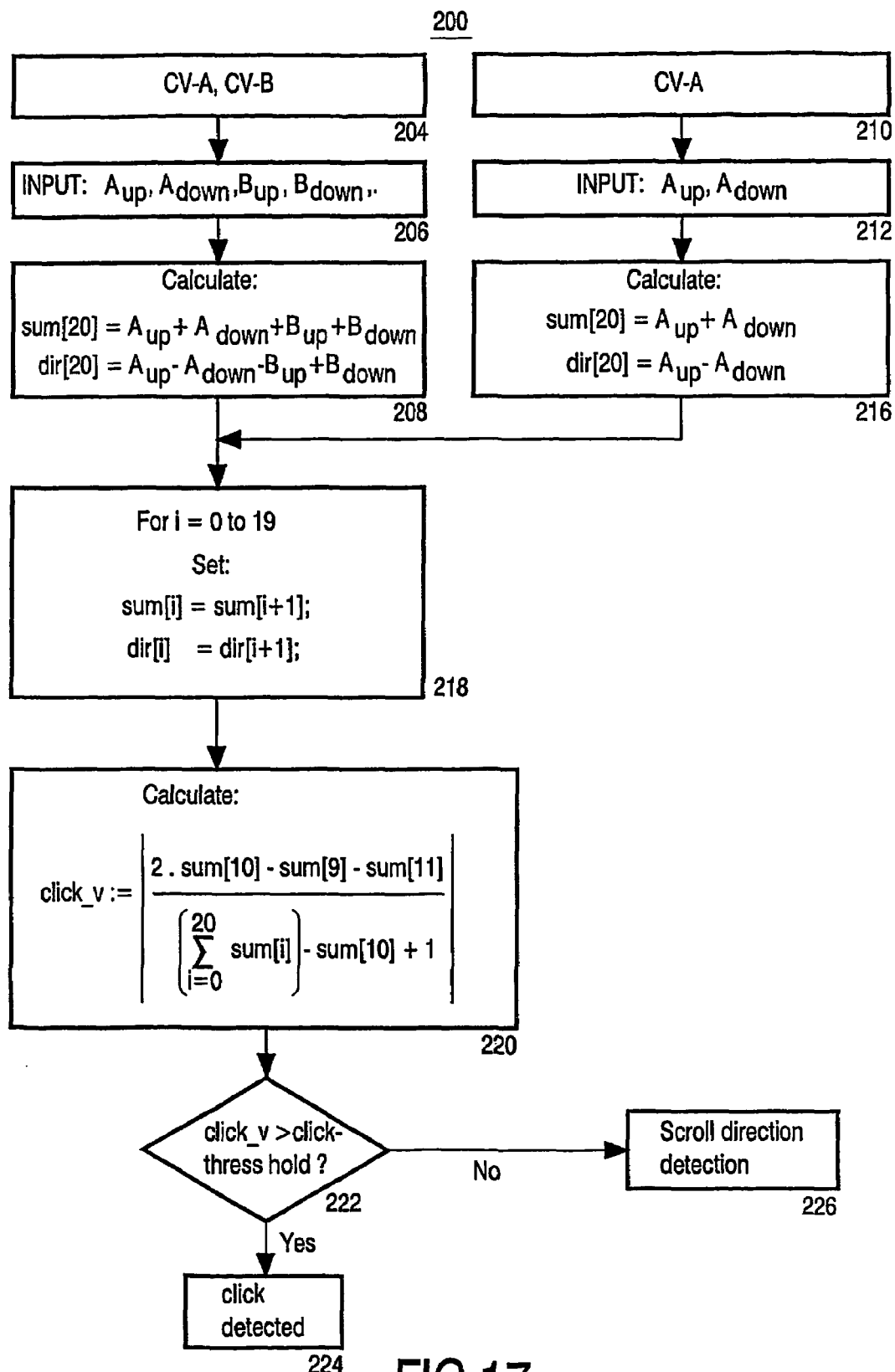
FIG. 17 shows a first portion of an algorithm to determine whether a click action has occurred.

A block diagram, or flow chart, of an example of the latter algorithm is shown in FIG. 17. This algorithm uses data about ten cycles before and ten cycles after a time interval, which is to be checked on the occurrence of a click action. The measurement is thus done in a field of twenty time intervals. These time intervals are denoted by "[I]" in FIG. 17. This algorithm can be used for an input device having only one optical sensor unit and one counter, which device supplies only counter output A. The algorithm can also be used for an input device having two sensor units and two counters, which device supplies two counter outputs A and B. These possibilities are denoted by blocks 210 and 204 in the upper right and left parts, respectively of FIG. 17. Both the counter values during the first half period (warming up of the diode laser) and during the second half period (cooling down of the diode laser) are used. The first and second half periods is denoted by the index "up" and "down", respectively. So, for the one-sensor device counter values $A_{up}$ and $A_{down}$ are used (block 212) and for the two-sensors device counter values $A_{up}$, $A_{down}$, $B_{up}$ and $B_{down}$ are used as is denoted in blocks 212 and 206, respectively.

In blocks 208 and 216 the velocity of the movement and the direction of a scroll movement are determined. As the velocity is the sum of all counter values it is denoted by "sum". The direction of the velocity is the difference between the "up" value and the "down" value of the same counter. For a two sensors device the direction of the velocity is the difference between the differences for the two counters. The velocity and direction of the movement are calculated for I=20, the last time interval taken into account for the momentarily measurement shown in FIG. 17.

Block 218 and the following blocks are the same for the one sensor device and the two-sensor device. In this block data of the preceding time intervals 0 to 19 are recalled by moving shift registers. In block 218 a value for a parameter, called click_v, is calculated for i=10, which parameter represents the probability that in time interval 10 a click action was performed. For this calculation not only data of interval 10, but also data of intervals 9 and 11 are used. The calculated click-v value is compared in block 222 with a stored click tress hold value and when the calculated value is larger than the threshold value it is ascertained that in time interval 10 a click action was performed (block 224). When the calculated value is smaller than the threshold value (block 226) the analysis may proceed with another algorithm to determine the scroll direction, as indicated in block 226 of FIG. 17.

Figure 18:
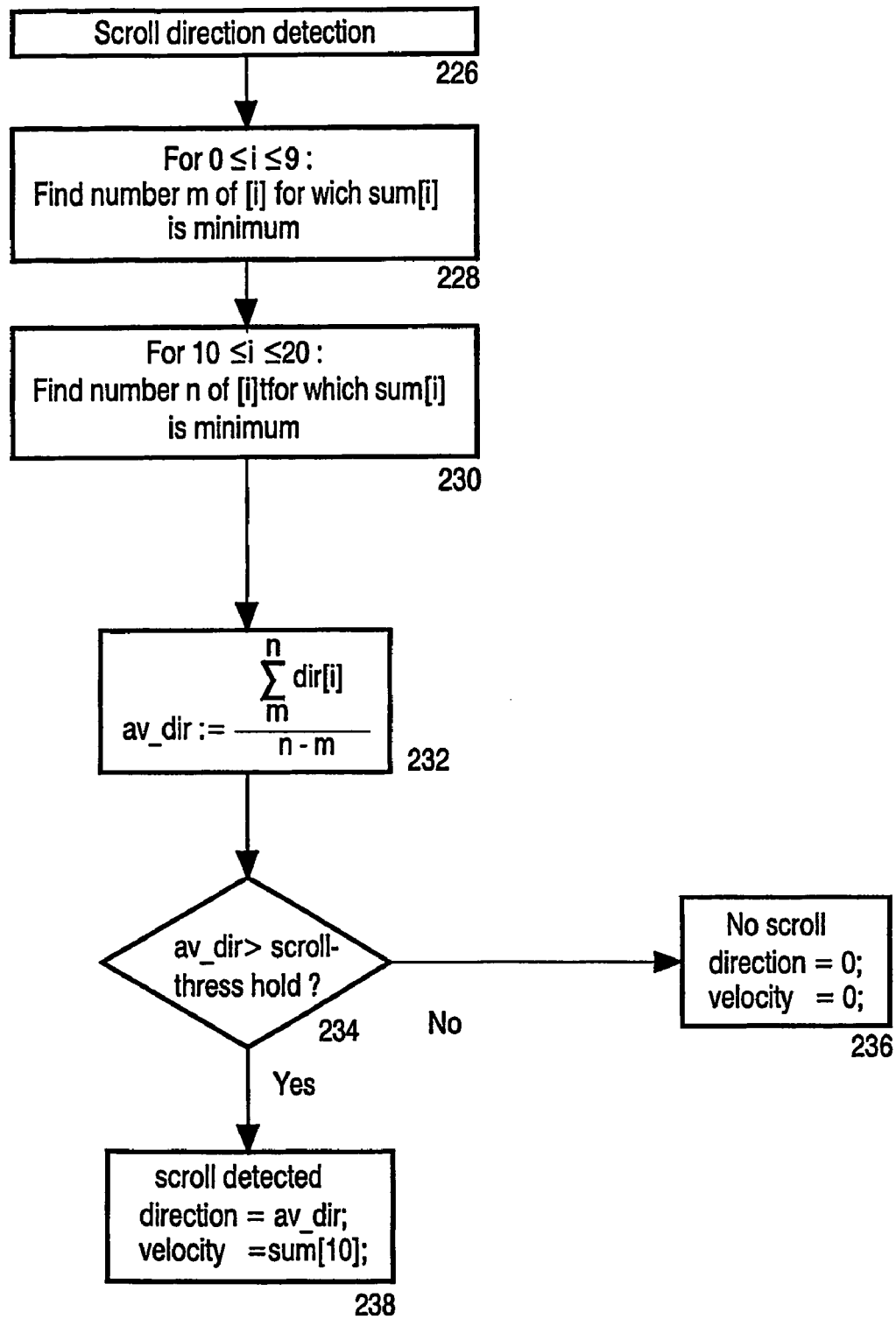
FIG. 18 shows second portion of the algorithm to determine whether a scroll action has occurred.

The latter algorithm is shown in FIG. 18. By means of this algorithm the reliability of the detection of the scroll direction is increased considerably. This is realized by determining for which of the time interval before and of which of the time intervals after the time interval that is actually analyzed the velocity, sum[i], is minimum. It is assumed that in the time between these time intervals the direction of movement does not change, because theoretically the direction can change only if the speed is zero.

In step 228 of FIG. 18 amongst the time interval I=0 to I=9 the time interval m for which the smallest sum[i] was measured is determined. In step 230 the same is done for the time interval i=10 to I=20. The determined time interval is n Then a value for a parameter called av_dir is calculated (step 232), which parameter represents the average of the measured direction values, dir[i] for i's between m and n. The calculated av_dir value is in step 234 compared with a stored scroll threshold value and when the calculated value is larger than the stored value it is ascertained that in time interval i=10 a scroll action was performed (step 238). The direction of the scroll movement is the just measured av_dir and the speed of the scroll movement is sum[10]. If the calculated value of av_dir is smaller than the scroll threshold it is ascertained in step 236 that no scroll action was performed, which is denoted by "direction=0" and "velocity=0".

The algorithm of FIGS. 17 and 18 memorizes data measured at time intervals not being the time interval that is actually analyzed. By delaying analysis of the data obtained during the time interval that is to be measured, for this analysis data from intervals before and after this time interval can be used for the analysis, which brings the reliability of the input device to a higher, thus far not existing, level. This algorithm supplies the information:

a click action was performed during the measured time interval, or the direction of a scroll movement during this time interval.

Figure 19:
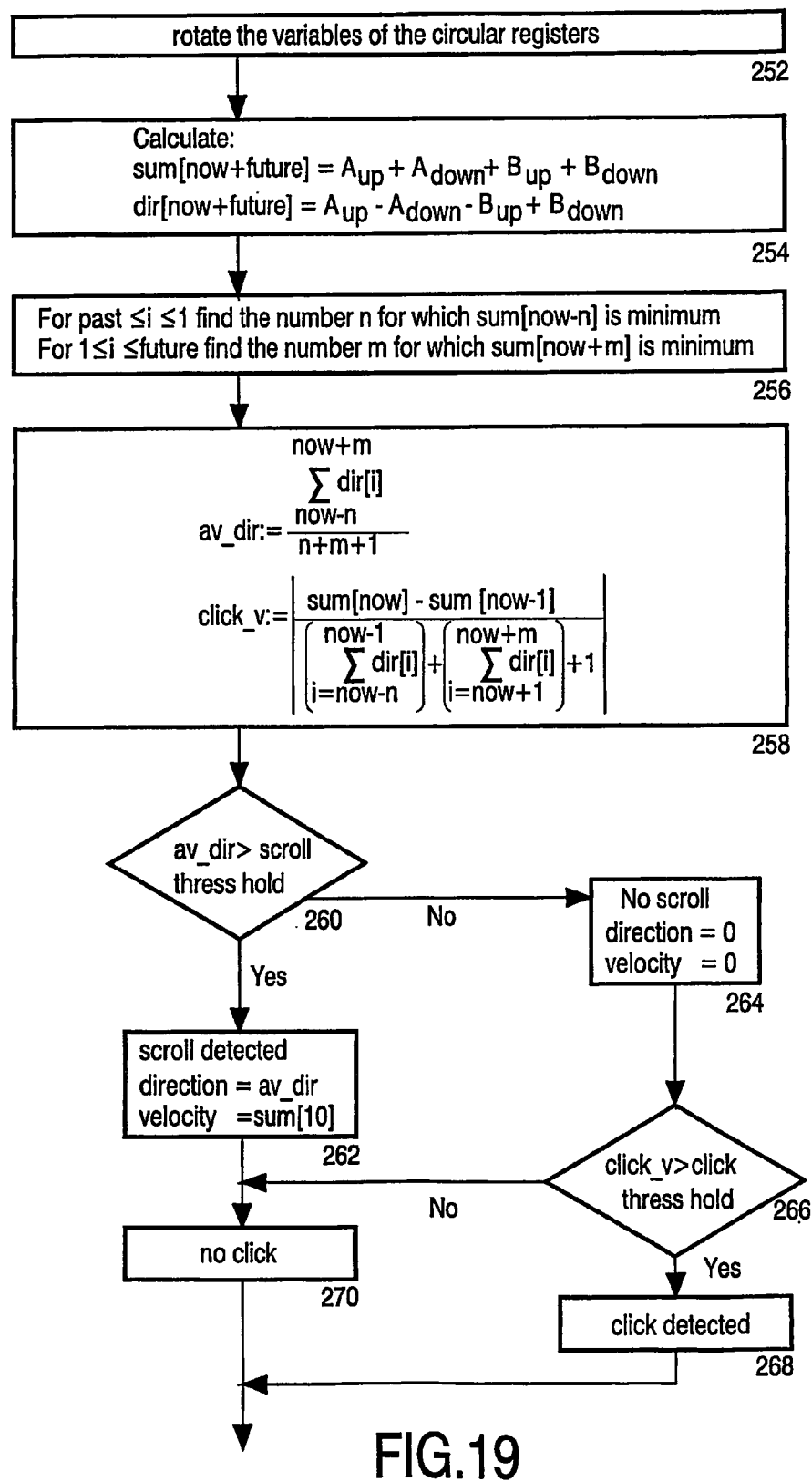
FIG. 19 shows a second embodiment of an algorithm to determine whether a click and/or scroll action has occurred.
Figure 20:
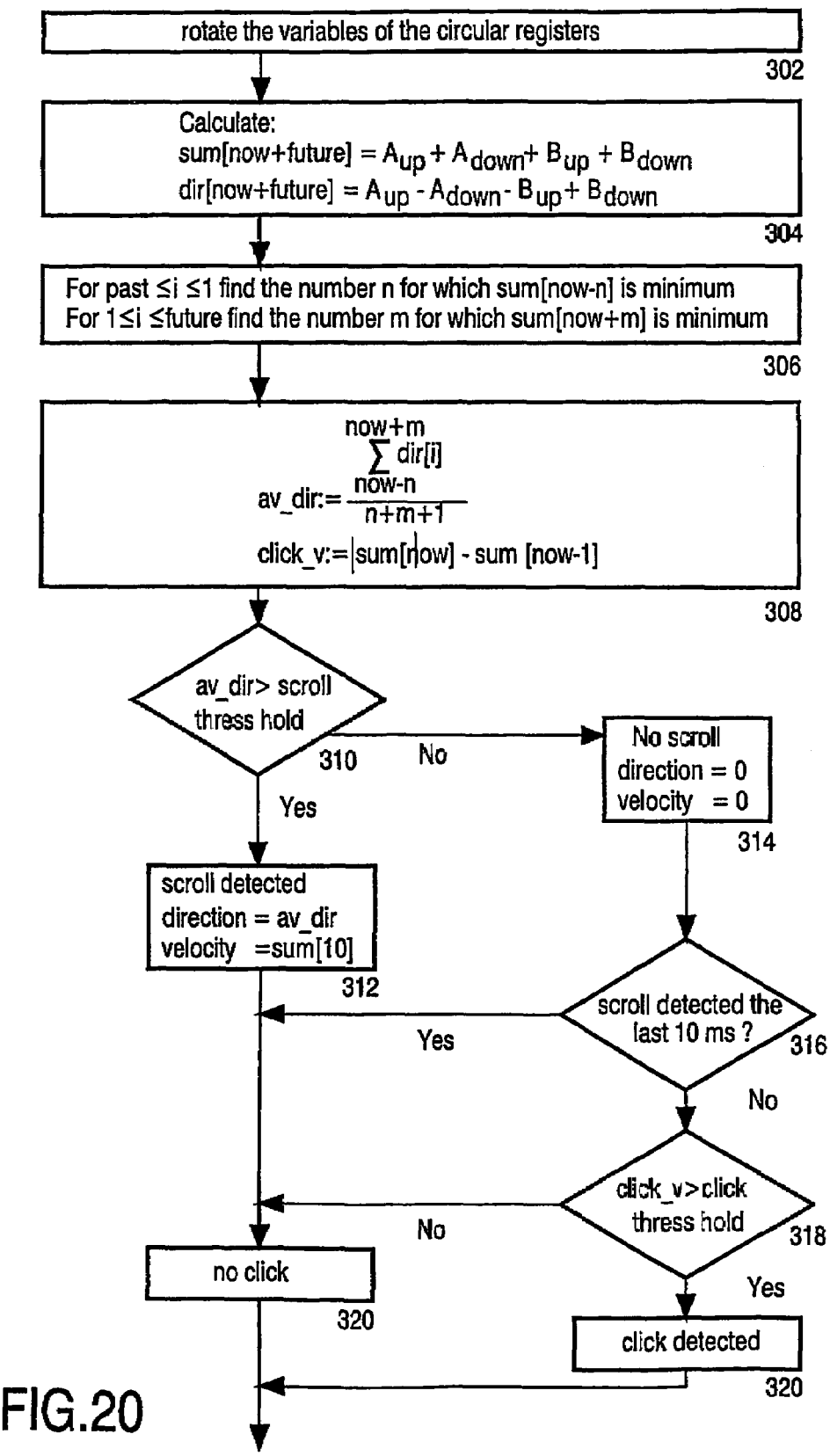
FIG. 20 shows a third embodiment of such an algorithm.

The algorithm of FIGS. 17 and 18 and those of FIGS. 19 and 20 are executed each time a new set of values are generated by the sensors of the input device.

The algorithm 250 shown in FIG. 19 is based on the same principle as that of FIGS. 17 and 18, but it detects first a scroll movement and then a click movement. This algorithm uses the additional constants "future" and "past", which stand for a pre-determined number of future and past time intervals, respectively, of which the measured data are used 20 during the analysis of the measured data obtained during the actual time interval. The actual time interval, i.e. the time interval which is to be checked on a scroll and click action, is called "now" in FIG. 19.

It is assumed that measured data are stored in circular registers. In the first step 252 is denoted that data of all past time intervals are used. In step 254 the speed (sum[now+future]) during the actual measurement and the future measurements as well as the direction, (dir) during these time intervals are measured. Then, in step 256, it is determined for which (n) of the past time intervals the difference of the speed measured during that time interval and the speed measured during the actual time interval, sum[now−n], is minimum. Also determined in this step is for which (m) of the future time intervals the sum of the speed measured during that time interval and the speed measured during the "now" interval is minimum. In step 258 the value average direction av_dir is calculated from the measured values between the time intervals [now−n] and [now+m]. Also calculated is the probability, click_v, that a click action was performed in the [now] time interval. Then it is determined whether the calculated value calculated av_dir is larger than the stored scroll tress hold value (step 260). If this is the case, it is ascertained (in step 262) that a scroll action was performed during the [now] time interval. The speed of the scroll movement is the speed measured during time interval 10, i.e. the [now] interval. If the value av_dir is not larger than scroll threshold and it has been ascertained, in step 264, that no scroll action was performed, it is determined, in step 266, whether the click action probability value, click_v, is larger than the stored click threshold value. If this is the case it is ascertained, step 268, that a click action was performed in time interval [now]. If this is not the case that neither a scroll action nor a click action was performed in time interval [now=10].

The algorithm 300 of FIG. 20 differs from that of FIG. 19 in that the click probability value click_v is calculated in a more simple way (step 308) and in that it is checked whether in the recent pasta scroll action was measured. Steps 302, 302, 306, 310, 312, 314, 318, 320 and 322 of algorithm 300 are the same as steps 252, 254, 256, 260, 262, 264, 266, 258 and 270 of algorithm 250, shown in FIG. 19. Algorithm 300 uses an additional step 316, between steps 314 and 318, in which step it is checked whether a scroll action has been detected the last ten milliseconds. Only if this is not the case it is determined whether a click action was performed.

The algorithms of FIGS. 17-20 are just examples of algorithms that maybe used to perform the new method, which employs the different time dependent behavior of a scroll action and a click action and employs historical data on measurements made at time intervals different from the time interval that is actually measured. This method can not only be used instead of the vector transform method described at the hand of FIGS. 5-7 for determining the direction of movement, but may also be combined with the vector transform method to obtain even better results.

As to the environment in which the method may be implemented, when using an optical input device hardly any requirements have to be set to the structure or reflection coefficient of the object, which is moved relative to the optical input device. It has been demonstrated that also the relative movement of a piece of paper and the device can be easily measured.

From an optical point of view, the dimensions of the optical input using the self-mixing method may be very small. The size of this device is mainly determined by the amount of electronics that has to be incorporated in the device and by the aspect of easy mass manufacturing. In practical embodiments, the window has a size of 3 mm to 5 mm squared. Because of the measuring principle used in this device, its components need not be aligned accurately, which is a great advantage for mass production.

In the embodiment of FIG. 1, the lens 10 may be made of glass or a transparent plastic material, like polycarbonate (PC) or polymethyl methacrylate (PMMA). Such a lens can be fixed to the substrate, carrying the diode lasers, the photo diodes and processing circuitry, by means of a transparent glue layer 11, for example of epoxy. For this embodiment, it is assumed that the diode lasers radiate in the vertical direction, so that these lasers may be of the VCSEL type. Such a laser can easily be placed on the base plate by means of a wire bounding technique.

Preferably more conventional side emitting diode lasers, which have a horizontal cavity, are used because they are considerably cheaper. Such a laser can be mounted in such a way that it radiates in the vertical direction. For example, the laser can be mounted on a small table. It is, however, also possible to mount side-emitting diode lasers in such a way that they emit in the horizontal direction.

FIG. 21a is a vertical cross-section of an embodiment of the optical input device with such lasers and FIG. 21b is a top view of the lower part of this embodiment. In these Figures, reference number 1 denotes the base-, or housing, plate, from which electrical contact pins 352 protrude. This base plate has such heat-conduction that it can function as a cooling element for the diode lasers. The electronic circuitry, which were shown schematically in FIGS. 1 and 8, may be mounted on a layer 350 of silicon or another material, which layer forms a circuit board. Also the embodiment of FIG. 1 may comprise such a layer. Elements 3, 5 and 7 are the side emitting diode lasers. For each of these lasers, a reflecting member 354 is provided, which reflect the horizontally emitted beam 358, 360 from the diode lasers in the vertical direction through the lens 10 towards the window 12 at the top of the device. Preferably the reflecting elements have a spherical shape so that they have also some optical power and convert the incident diverging beam 358, 360 into a less divergent, or a collimated, or even slightly converging, beam. The optical power of the lens 10 can then be smaller than that of the lens 10 in the embodiment of FIG. 1. Also in the embodiment of FIGS. 21a and 21b, the lens 10 may be a glass lens, but is preferably a plastic lens. A plastic lens is cheaper and lighter than a glass lens and is very suitable in this application because no stringent optical requirements are set to this lens. A cap 356, which is preferably made of plastics and is provided with a transparent window 12, forms the housing of the device together with the housing plate 1. The three, or in case only two diode lasers are used the two, reflecting members may be constituted by one plastics ring which is covered by a reflecting coating. Said ring may form an integral part of the base plate 1. The input device then mainly consists of plastic material and is composed of only three constructional parts, which can easily be assembled. These parts are: the base plate 1, which is provided with the reflecting ring, the contact pins 352 and the diode lasers and associated photo diodes, the lens 10 and the cap 356 provided with the window 12.

FIG. 22 shows a preferred embodiment of the input device wherein a further integration of parts has been carried out. In this embodiment, the cap 356 and the lens 10 of the embodiment of FIG. 21a are replaced by a single plastic element 362 the lower side of which is curved towards the base plate. This curved surface has the same refractive effect on the illumination beams as the lens 10 in FIG. 21a. A top view of the lower part of the embodiment of FIG. 22 is not shown because this part is the same as that of FIGS. 21a and 21b. The embodiment shown in FIG. 22 is composed of only two constructional parts and is even easier to assemble than the embodiment shown in FIGS. 21a and 21b.

In the embodiments shows in FIGS. 8, 21a, 21b, 22, 23a and 23b, the illumination beams are not focused in the plane of the window. As, moreover, these beam originate from different positions at the base plate level, the illumination beams form illumination spots at different positions in the action plane, for example the plane of the window. The illumination beams and their scattered radiation are sufficient spatially separated, so the crosstalk between the different measuring axes is no problem in this input device. If necessary, a residual crosstalk can be reduced by using diode lasers with slightly different wavelengths. For this purpose, a wavelength difference of a few nm is already sufficient.

Another possibility of eliminating crosstalk is, to use of a control drive for the diode lasers, which causes only one laser to be activated at any moment. A multiplexing driving circuit, which circuit alternately activates the different diode lasers, may constitute such a control drive. Such multiplexing circuit allows to monitor of two or three diode lasers by means of one detector, or photodiode, which is arranged within reach of each of the diode lasers and is used in a time sharing mode. An additional advantage of the embodiment with such a driving circuit is that the space needed for the circuitry and the electric power consumption of the device is reduced.

FIGS. 23a and 23b show an embodiment of the input device wherein the illumination beams are guided to the window by optical fibers. FIG. 32 is a vertical cross-section and FIG. 23b is a top view of this embodiment. The input ends of fibers 370, 372 and 374 are optically coupled to the diode lasers 3,5 and 7, respectively, in a well-known way. All output ends of the fibers are located at the window of the device. The fibers may be embedded in a cap 376 of solid material, for example, epoxy or another transparent or non-transparent material. Each of these fibers forms an isolator for the radiation guided by this fiber, both for the measuring radiation from the associated diode laser and for the scattered radiation returning to this laser. As a consequence, the possibility of crosstalk between the different measuring axes is very small to zero. Other advantages of fibers are that they are flexible, which increases the design possibilities, and that they can transport the radiation over arbitrary distances so that the diode lasers and photodiodes can be arranged at quite remote distances from the window of the input device. In the embodiment of FIGS. 23a and 23b, the diode lasers and associated photo diodes are arranged close together. These elements may be arranged in a separate compartment 378, as shown in FIG. 23a, which compartment may be of the same material as the cap or of another material.

Instead of fibers, other light guides may be used, for example, channels in a body of transparent or non-transparent material.

As the input device described above can be manufactured at low costs, it is very suitable to be built-in in mass consumer apparatus. Because of its very small size and light-weight, this device can easily be integrated in existing apparatus, thereby increasing the capabilities of these apparatus without substantially increasing their costs and weight. If the components of the input device are separate elements, instead of being integrated in one module (FIGS. 21-23) the components can be arranged at positions in the apparatus wherein some space has left so that the original design of the apparatus needs not to be changed.

The new method may be used with other types of optical input device, for example the input device shown in FIG. 24, which is reproduced from EO-A 0 924 285 and intended for measuring movement of a surface 402, which may be a finger surface. The device comprises a diode laser 404 for supplying a measuring beam 406, which is incident on the surface 402. A partially transmitting diffraction grating 408 is arranged close to the surface 402. Radiation that is reflected from this grating and radiation reflected from the surface 402 are both incident on a radiation-sensitive detector 420 after passage through a spatial filter. This filter is composed of a lens 412 and a pinhole diaphragm 416. The radiation interfering on the detector generates a beat signal, i.e. an oscillating signal that is dependent on the movement of the surface 402. The beam of radiation reflected by the grating 408 and captured by detector 420 is used as a local oscillator beam. Preferably this beam comprises radiation that is reflected in the zero order by the grating. The grating produces also a plus and minus first order beam 414,418, which may also be used. Reference number 410 in FIG. 24 denotes radiation that is scattered by the surface 402. For details about this input device and embodiments thereof reference is made to EP-A 0 942 285.

The invention can also be implemented in a capacitive input device, which is a new type of input device invented and developed in the labs of the inventors to replace the well-known mechanical scroll-and-click device. This mechanical device is relative expensive, suffers from wear, is sensitive for dust and water and can not easily be integrated in existing or future apparatus. A capacitive input device does not show these disadvantages, is cheap and small and shows the advantage that it comprises only electronic components. Moreover it operates through the housing of the apparatus wherein it is embedded so that it need not to be placed on the housing and no window need to be made in the housing.

Capacitive sensors, which are well-known per se, are able to detect the presence of an electrically conducting material as well as a material that has a dielectric constant that is different from the dielectric constant of the environment. They can measure the distance and the size of such a material. A capacitive sensor generates an electric AC field that is influenced by the presence of said material. The capacitive input device uses the insight that a human finger is such a material and that a capacitive sensor can be used to detect the presence of the finger some centimeters remote from the sensor, thus for example at the housing surface of the apparatus.

FIG. 25 shows, diagrammatically and by way of example, a mobile phone apparatus 430 provided with a capacitive input device 434 for measuring the movement of a finger 80, which comprises two sensors 436,438. The mobile phone, which may have any shape, has housing 43 and a display 434. Other components of the mobile phone, which are not relevant to the present invention, are not shown in FIG. 25. The input device 434 in the embodiment of FIG. 25 is a scroll-and-click devices and comprises two capacitive sensors 436, 438 and associated electronic driving and signal processing circuitry's 440,442. As the principle of a capacitive sensor is known per se, it will not be described here. It is only noted that a capacitive sensor generally comprises an electrode, which generates an electric AC field, and an electronic circuit to drive the electrode and to measure the change in the electrical field. The capacitive input device may comprise two capacitive sensors, as shown in FIG. 25 and the right-hand portions of FIGS. 26 and 27 or one field generating electrode and two receiving, i.e. field detecting, electrodes, as shown in the right-hand portion of FIG. 28. In any case two signals are generated capacitively, each of which increases when the finger gets closer to the respective electrode. The electrodes of the sensors may be constituted by electrically conducting tracks on the printed circuit board (PCB) of the apparatus of which the input device forms part. The associated electronic circuits 440,442 may be mounted as such on the PCB or may form part of other circuitry of the apparatus, like the mobile phone. The, changing, electrical field is denoted by reference number 444 in FIG. 25. As the capacitive input device comprises two sensors generating two measuring signals, it allows measuring of the finger movement in two directions.

FIGS. 26, 27, 28 show different embodiments of processing the two measuring signals $S_1$, $S_2$ from the sensors 436, 438. These signals are supplied to differential circuits 450, 452, for example analogue circuits) to determine the first (prime) derivatives $S_3$, $S_4$ of the signals $S_1$, $S_2$, respectively. The derivative signals are not sensitive to drift effects and comprise an indication about the sign of the movement, i.e. toward or away from the respective sensor or electrode. When the finger is approaching a sensor the derivative signal is positive and when the finger is moving away from the sensor the derivative signal is negative. Signals $S_3$ and $S_4$ are both supplied to a subtracting circuit 454, wherein signal $S_4$ is subtracted from signal $S_3$, and to an adding circuit 456. Signal $S_5$ from the subtracting circuit is supplied to a comparing circuit 458, to compare this signal with a stored scroll tress hold value. Signal $S_6$ from the adding circuit 456 is supplied to a comparing circuit 460 to compare this signal with a stored click threshold value. If signals $S_3$ and $S_4$ are comparable and change both fast from negative to positive, signal $S_6$ will have a fast increasing positive value and circuit 460 will supply a click signal $S_{click}$. If signals $S_3$ and $S_4$ have opposite signs, signal $S_5$ from the subtracting circuit will have a large absolute value and circuit 458 will supply a scroll signal $S_{scroll}$. If the finger moves upward, i.e. away from sensor 438 and toward sensor 436, signal $S_3$ will be is positive and signals $S_4$ will be negative and signal $S_5$ will have a large positive value. Signal $s_{scroll}$ will indicate then an up-scroll movement. If the finger moves downward, i.e. away from sensor 436 and toward sensor 438, signal $S_3$ will be negative and signal $S_4$ will be positive and signal $S_5$ will have a large negative value. Signal $S_{scroll}$ will then indicate a down-scroll movement.

The embodiment of FIG. 27 differs from that of FIG. 27 in that signals $S_2$ is first subtracted from signal $S_1$, in subtracting circuit 462, and that signals $S_1$ and $S_2$ are first added, in adding circuit 464, to obtain signals $S_7$ and $S_8$. Now the first derivatives of the latter signals are determined in differentiating circuits 466 and 468. The resulting signals $S_9$, $S_{10}$ again are supplied to comparing circuits 470, 472. The principle of signal processing of FIG. 27 is the same as that of FIG. 26.

This holds also for FIG. 28. This FIG. has been added to show the principle of a capacitive sensor device wherein the two capacitive sensors are constituted by a common AC field generating electrode 480 and associated electronics (FE) 482 and two detecting (field receiving) electrodes 484, 486 and their associated electronics (F;R) 486 and 490, respectively. The signals $S_1$, S2 from the field detectors are processed in the same way as shown in FIG. 26.

The electronic components of the signal interpreting logical circuitry shown in FIGS. 26-28 may be imbedded in a microprocessor of the apparatus in which the capacitive input device is arranged.

A third capacitive sensor may be added to this device to allow measuring movement of a finger, or other object, in three dimensions. Then a click action and two scroll actions, in different directions in the same plane, can be measured.

FIG. 29 shows a signal interpreting circuitry 500 that is very suitable for practice and is a further elaboration of the circuitry of FIG. 26. The two capacitive sensors are denoted by reference numerals 502 and 504. Use is made of a third reference, or ground, electrode 506. The electrical fields for the two sensors are generated by means of two independent oscillators 510 and 520, respectively. The frequency of these oscillators is determined by the presence of a finger in the neighborhood of the respective sensor electrode and the distance of the finger, or other object, from the electrode. For, the finger changes the electrical capacity of the oscillator. Each oscillator comprises a buffered inverter 514,524 and a capacitance 512,522. The output of each oscillator is supplied to a Schmitt-trigger 518,528. The output of each Schmitt-trigger is connected to the input of a frequency counter (FC) 518, 528, which is controlled by a timer (TR) 532. The output of each frequency counter is coupled to an input of a circuit 520, 530, which can be called a differentiating circuit (DIFF). These circuits are also controlled by the timer 532 and comprise a memory and a subtracting circuit to subtract the last measured value from the current (actual) value. The output of each differentiating circuit 520,530 is coupled to an input of both an adding circuit 534 and a subtracting circuit 536. The output of the adding circuit is connected to the input of a comparing circuit ($C_{TH}$) 538, which compares the sum signal with a stored click threshold and puts out a click signal $S_{click}$ if the measured value is larger than the threshold value. The output of the subtracting circuit 536 is coupled to the input of a comparing circuit ($S_{TH}$) 540, which compares the measured value with a stored scroll threshold value and puts out a scroll signal $S_{scroll}$ if the measured value is larger than the threshold value.

Preferably, the electronic circuitry within the block 542 is digital circuitry, which can be easily integrated in a digital IC.

FIG. 30 shows an embodiment of a signal interpreting circuitry 550 that is a further elaboration of the circuitry of FIG. 28 and is very suitable for practice. The two capacitive sensors have a common electrical field-generating electrode 552 and each sensor has a receiving electrode 554,556. Now, the electrical field is generated by means of only one oscillator 558. The presence of a finger in the electrical field causes a coupling between the field-generating electrode and the receiving electrode, which coupling is dependent on the distance between the finger and the respective receiving electrode. The current (signal) generated in each receiving electrode is amplified in an associated amplifier (AM) 560,562, which may be a phase locked amplifier. The output of the amplifier is connected to the input of a differentiating circuit 564,566. The output of each amplifier is connected to an input of both a adding circuit 568 and a subtracting circuit 570. A comparing circuit ($C_{TH}$) 572 checks whether the value supplied by the adding circuit is larger than a stored click threshold value. If yes, the circuit 572 puts out a click signal $S_{click}$. A comparing circuit ($C_{TH}$) 574 checks whether the value supplied by the subtracting circuit is larger than a stored scroll threshold value. If yes, the circuit 574 puts out a scroll signal $S_{scroll}$.

For performing the mentioned tasks no high precision is necessary and low cost components can be used. The circuitry of FIG. 30 may be a complete analogue circuitry.

The capacitive sensors of the embodiments of FIGS. 29 and 30 preferably are integrated on the main board of the apparatus hosting the capacitive input device. Ss the electrodes can be constituted by electrically guiding tracks on the apparatus' printed circuit board, the capacitive input device is thus not a separate module device that has to be built-in as such in the apparatus. The capacitive input device requires only low cost and small components. A specific advantage of the capacitive input device is, that no components need to be places in or on the housing of the apparatus, provided that the housing material is a non-conducting material, such as plastics.

In the capacitive input device described above a new algorithm, which uses the different nature (time behavior) of click action and scroll action signals and/or historical data of such actions, may be used in place of, or in addition to the signal interpretation methods of FIGS. 26-30.

In general, the invention can be used in any type of input device that upon performing a click action generates a detector signal having a different nature than a detector signal generated upon performing a scroll action and wherein historical data about these action can be stored and used during evaluation of actual actions. For example, the invention may also be used in a mechanical input device for performing scroll and click actions, such as a mechanical mouse.

An input device wherein the invention is implemented may not only be used in a mobile, or cellular, phone apparatus, but also in other apparatus of different types, some of which are shown in the next FIGS.

FIG. 31 shows a cordless phone apparatus 600 provided with an input device, optical or capacitive, wherein the invention is implemented. This apparatus is composed of a base station 602, which is connected to a phone or cable network and the movable apparatus 604 which can be used within an area with a radius of, for example, less than 100 m from the base station. Apparatus 604 comprises a keyboard section 605 and a display device 607. In a similar way as described for the mobile phone apparatus, the apparatus 604 is provided with a user's input device 609 as discussed herein above. This device is an optical input device of which only the window is shown. Instead of with an optical input device, the cordless phone may also be provided with a capacitive input device. As the capacitive input device is not visible at the outside of the cordless phone the position where the user has to put his finger should be marked on the housing of the cordless phone. Preferably this marker has the form of a raised convex portion of the housing surface so that the user can easily find the device position, even in poor lighting conditions. This holds for all apparatus wherein a capacitive input device is used.

FIG. 32 shows a remote control unit 620 for use with a conventional TV set 610, which comprises a receiver and display apparatus 611 and a set top box 618 to make it suitable for Internet communication. This box provides access to the Internet via a phone or cable network, and converts the signal received from the Internet into a signal that can be processed by the TV set in order to display the Internet information. As a user of the TV Internet should have the input device for Internet commands at hand, this input device 624 should be integrated in the remote control unit. The input device 624, wherein the invention may be implemented and which in FIG. 32 is supposed to be an optical input device of which only the window is shown, may be arranged between the conventional buttons 622 of the remote control unit or at any other position within reach of any of the human fingers holding the remote control unit. The input device may also be a capacitive input device.

An input device wherein the invention is implemented may also be used in a computer configuration to replace a conventional hand-driven track-ball mouse or a mouse pad. FIG. 33 shows a portable computer 630, known as notebook or laptop, comprising a base portion 632 and a cover portion 636 with an LCD display 638. The base portion accommodates the different computer modules and the keyboard 634. In this keyboard, an optical input device 640 as described herein above is arranged which replaces the conventional mouse pad. The input device, which may also be a capacitive device, may be arranged at the position of the conventional mouse pad or at any other easily accessible position.

A hand-held, or palmtop, computer is a smaller version of the notebook. Also such a palmtop computer may be provided with an optical input device wherein the invention is implemented, for example to replace a pen for touching the display screen, which pen is usually applied to select a function of a displayed menu. The, optical or capacitive, input device may be arranged in the keyboard of the palmtop computer, but also at the inner side of the cover.

FIG. 34 shows a desktop computer configuration 650 wherein an, optical or capacitive, input device can be applied in several ways to replace the conventional trackball mouse. The computer configuration is composed of a keyboard 652, a computer box 654 and a monitor 656. The monitor may be a flat LCD monitor fixed in a support 658, as shown in the Figure, or a CRT monitor. Preferably the input device 666 is integrated in the keyboard so that a separate mouse 660 and its cable to the computer box are no longer needed. Instead of this, it is also possible to replace the trackball mouse by an optical mouse equipped with the optical input device. This device is then inverted; i.e. the window of the device faces the underground across which the mouse is moved. The input device measures this movement and not the movement of a human finger across the window as in the previous applications. Use is now made of the great sensitivity of the optical input device. The device is able to detect its movements relative to a rather smooth surface, for example a piece of blank paper.

In the computer configurations described above, the input device may be arranged in the display portion, instead of in the keyboard portion, for example in the cover 636 of the laptop computer of FIG. 33 or in the cover of a palmtop computer. The input device may also be incorporated in displays other than computer displays.

The invention claimed is:

1. A method comprising:
  supplying a sensor signal, the sensor signal including a first number and a second number of sensor signal undulations during a first half and a second half, respectively, of a measuring time interval, and
  analyzing the sensor signal to detect movement of an object relative to a source of the sensor signal corresponding to scroll action and click action by determining whether a given time pattern of the reflected sensor signal corresponds to a first typical time pattern of a click action or a second typical time pattern of a scroll action, the analyzing step comprising determining at least one of (i) a sum of the first and second number to detect click action motion during the measuring time interval and (ii) a difference of the first and second number to determine a direction of a scroll movement of the scroll action and/or a sum of the first and second number to determine a speed of the scroll movement.

2. A method as claimed in claim 1, wherein the analyzing of the reflected sensor signal obtained during the measuring time interval includes using movement data obtained during other time intervals.

3. A method as claimed in claim 1, wherein the sensor signal includes a plurality of activation pulses and the measuring time interval is determined at least in part by the activation pulses.

4. A method as claimed in claim 1, wherein the analyzing includes using a capacitive sensor unit for measuring scroll action and/or click action.

5. A method comprising:
  supplying a sensor signal, and
  analyzing the sensor signal using an optical sensor unit to detect movement of an object relative to a source of the sensor signal corresponding to scroll action and click action, wherein analyzing the reflected sensor signal includes determining whether a given time pattern of the reflected sensor signal corresponds to a first typical time pattern of a click action or a second typical time pattern of a scroll action,
  wherein the supplying of the sensor signal includes illuminating an object surface with a measuring laser beam from a diode laser cavity, such that the measuring beam radiation is reflected back along the measuring beam and re-enters the diode laser cavity, and wherein the analyzing includes measuring changes in operation of the laser cavity, which are representative of a relative object movement.

6. A method as claimed in claim 5, wherein an impedance of the diode laser cavity is measured.

7. A method as claimed in claim 5, wherein an intensity of the laser radiation is measured.

8. An input device comprising:
  at least one sensor unit, and
  a signal analyzer,
  wherein each sensor unit is configured to measure a sensor signal corresponding to scroll action and click action, and the signal analyzer is configured to analyze a given time pattern of the sensor signal to distinguish a first typical sensor signal time pattern of a click action from a second typical sensor signal time pattern of scroll action, and
  wherein the signal analyzer is configured to count a first number and a second number of sensor signal undulations during a first and second half, respectively, of a measuring time interval, and (i) add the first number and the second number to supply click action information and/or (ii) determine a difference between the first and second number to supply information about a direction and speed of a scroll movement.

9. An input device as claimed in claim 8, wherein the signal analyzer is configured to combine results obtained at different time intervals.

10. An input device as claimed in claim 8, wherein the at least one sensor unit is activated by an activation signal and the signal analyzer is synchronized in time with the sensor unit such as to perform analysis in measuring time intervals that are determined by the activation signal.

11. An input device as claimed in claim 8, wherein the signal analyzer is configured to determine whether a click action is performed, whether a scroll action is performed, and a direction and the speed of the scroll action.

12. An input device as claimed in claim 8, wherein the at least one sensor unit includes at least one capacitive sensor unit.

13. An input device as claimed in claim 12, wherein the at least one sensor unit includes at least one capacitive sensor units.

14. An input device comprising:
at least one sensor unit, and
a signal analyzer,
wherein each sensor unit is configured to measure a sensor signal corresponding to scroll action and click action, and the signal analyzer is configured to analyze a given time pattern of the sensor signal to distinguish a first typical sensor signal time pattern of a click action from a second typical sensor signal time pattern of scroll action, and
wherein the at least one sensor unit includes at least one optical sensor unit that includes: a diode laser and a laser cavity that is configured to generate a measuring beam, one or more optical elements that are configured to converge the measuring beam in a plane near an object that reflects the measuring beam, and a converter that is configured to convert measuring beam radiation reflected by the object into an electrical sensor signal.

15. An input device as claimed in claim 14, wherein the at least one sensor unit includes at least two similarly configured optical sensors.

16. An input device as claimed in claim 14, wherein the at least one sensor unit includes: a partially transmitting component, arranged close to a transparent window of the input device, and configured to split-off a portion of the measuring beam as a reference beam; and a radiation-sensitive detector having a small opening to receive the reference beam and the measuring beam radiation reflected by the object.

17. An input device as claimed in claim 14, wherein the converter includes the laser cavity and is configured to measure changes in operation of the laser cavity due to interference of reflected measuring beam radiation re-entering the laser cavity and the optical wave in the laser cavity, and are representative of a relative movement of the object and the input device.

18. An input device as claimed in claim 17, wherein the converter is configured to measure a variation of impedance of the laser cavity.

19. An input device as claimed in claim 17, wherein the converter is configured to measure radiation emitted by the laser.

20. An input device as claimed in claim 19, wherein the converter includes a radiation detector that is arranged at a side of the laser cavity opposite a side where the measuring beam is emitted.

* * * * *